(12) United States Patent
Crosson

(10) Patent No.: US 11,641,148 B2
(45) Date of Patent: May 2, 2023

(54) ACTUATOR, ELECTRIC MOTOR AND ASSOCIATED METHOD

(71) Applicant: Regal Beloit America, Inc., Beloit, WI (US)

(72) Inventor: Jeffrey William Crosson, Dayton, OH (US)

(73) Assignee: Regal Beloit America, Inc., Beloit, WI (US)

( * ) Notice: Subject to any disclaimer, the term of this patent is extended or adjusted under 35 U.S.C. 154(b) by 1124 days.

(21) Appl. No.: 16/153,966

(22) Filed: Oct. 8, 2018

(65) Prior Publication Data

US 2020/0112235 A1    Apr. 9, 2020

(51) Int. Cl.
H02K 11/23 (2016.01)
H01H 35/10 (2006.01)
H02P 1/12 (2006.01)

(52) U.S. Cl.
CPC ............ H02K 11/23 (2016.01); H01H 35/10 (2013.01)

(58) Field of Classification Search
CPC ........ H02K 11/23; H02K 11/21; H02K 11/20; H01H 35/10; H01H 35/06; H02P 1/42; H02P 1/16; H02P 1/12; H02P 1/04; H02H 7/093
See application file for complete search history.

(56) References Cited

U.S. PATENT DOCUMENTS

| | | |
|---|---|---|
| 1,926,339 A | 9/1933 | Kindl et al. |
| 2,187,207 A | 1/1940 | Mccabe |
| 2,199,232 A | 4/1940 | Taylor |
| 2,277,425 A | 3/1942 | Wiest |
| 2,372,064 A | 3/1945 | Esarey |
| 2,512,405 A | 6/1950 | Willits et al. |
| 2,538,410 A | 1/1951 | Bretch |
| 2,608,677 A | 8/1952 | Wrightman et al. |
| 2,616,682 A * | 11/1952 | Greenhut ............... H01H 35/10 73/493 |
| 2,691,127 A | 10/1954 | Oliwa |
| 2,747,854 A | 5/1956 | Schnepf |
| 2,767,274 A | 10/1956 | Ritter |
| 3,014,142 A * | 12/1961 | Lee ......................... H02K 21/02 310/162 |
| 3,271,602 A | 9/1966 | Waters |
| 3,381,197 A | 4/1968 | Waters et al. |

(Continued)

FOREIGN PATENT DOCUMENTS

| | | |
|---|---|---|
| CA | 1300213 C | 5/1992 |
| CA | 1312112 C | 12/1992 |

*Primary Examiner* — Edgardo San Martin
(74) *Attorney, Agent, or Firm* — Armstrong Teasdale LLP

(57) ABSTRACT

An electrical switch for an electric machine includes body, a stator fixedly secured to the body and a rotor. The actuator includes a first member securable to the rotor and rotatable with it. The actuator also includes a second member, a first electrically conductive member cooperates with the second member. The actuator also includes a second electrically conductive member. The second electrically conductive member is spaced from said first electrically conductive member when said first electrically conductive member is in the first axial position and electrically engaged with said first electrically conductive member when said first electrically conductive member is in the second axial position.

18 Claims, 17 Drawing Sheets

(56) References Cited

U.S. PATENT DOCUMENTS

| | | |
|---|---|---|
| 3,575,562 A | 4/1971 | Remke |
| 3,609,421 A | 9/1971 | Hildebrandt |
| 3,691,415 A | 9/1972 | Handcock et al. |
| 3,790,730 A | 2/1974 | Wyland |
| 3,881,143 A | 4/1975 | Fannin et al. |
| 4,034,173 A | 7/1977 | Crow et al. |
| 4,182,952 A * | 1/1980 | Moore ................ H01H 35/10 200/80 R |
| 4,205,245 A | 5/1980 | Hildebrandt et al. |
| 4,208,559 A | 6/1980 | Gray |
| 4,224,542 A | 9/1980 | Kawano et al. |
| 4,242,607 A | 12/1980 | Hildebrandt et al. |
| 4,284,864 A | 8/1981 | Crow et al. |
| 4,289,988 A | 9/1981 | Schaefer |
| 4,296,366 A | 10/1981 | Hildebrandt et al. |
| 4,315,118 A | 2/1982 | Kramer et al. |
| 4,334,161 A | 6/1982 | Carli |
| 4,336,472 A | 6/1982 | Czech |
| 4,377,731 A | 3/1983 | Georgelin |
| 4,386,290 A | 5/1983 | Monette |
| 4,598,185 A | 7/1986 | Moore |
| 4,614,904 A | 9/1986 | Yamazaki et al. |
| 4,661,732 A | 4/1987 | Gehrt |
| 4,788,763 A * | 12/1988 | Fisher ................ H01H 1/26 200/80 R |
| 4,894,496 A * | 1/1990 | Palumbo ................ H01H 35/10 200/80 R |
| 4,922,066 A | 5/1990 | Crow et al. |
| 5,153,471 A | 10/1992 | Ottersbach |
| 5,283,405 A | 2/1994 | Nolte et al. |
| 5,293,090 A | 3/1994 | Heilman et al. |
| 6,126,402 A * | 10/2000 | Fisher ................ F04B 49/035 310/68 E |
| 6,710,271 B2 | 3/2004 | Spedale et al. |
| 6,982,507 B2 * | 1/2006 | Lin ................ H02K 11/23 200/80 R |
| 7,589,449 B2 * | 9/2009 | Kitamura ............ H02K 11/048 310/156.16 |
| 9,583,996 B2 | 2/2017 | Hussey et al. |
| 9,734,969 B2 | 8/2017 | Wehrheim |

\* cited by examiner

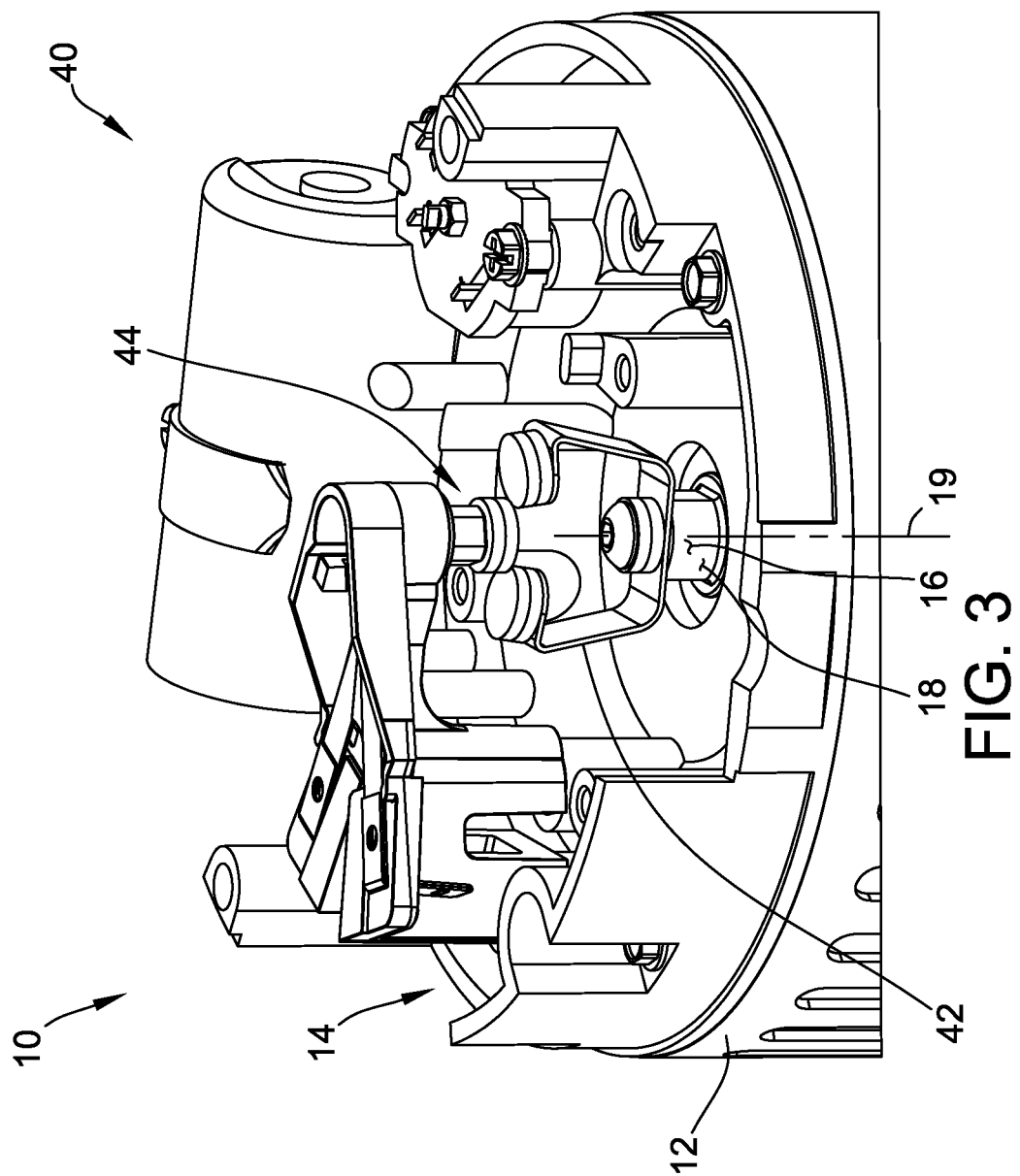

ACTUATOR, ELECTRIC MOTOR AND ASSOCIATED METHOD

BACKGROUND OF THE INVENTION

The embodiments described herein relate generally to an electric machine, and more specifically, to an electric machine with a switch activated or deactivated when a rotational speed is obtained.

An electric machine is typically in the form of an electric generator or an electric motor. The machine typically has a centrally located shaft that rotates relative to the machine. Electrical energy applied to coils within the machine initiates this relative motion which transfers the power to the shaft and, alternatively, mechanical energy from the relative motion of the generator excites electrical energy into the coils. For expediency, the machine will be described hereinafter as a motor. It should be appreciated that a machine may operate as a generator and vice versa.

A stationary assembly, also referred to as a stator, includes a stator core and coils or windings positioned around portions of the stator core. It is these coils to which energy is applied to initiate this relative motion which transfers the power to the shaft. These coils are formed by winding wire, typically copper, aluminum or a combination thereof, about a central core to form the winding or coil. An electric current is directed through the coils which induces a magnetic field. It is the magnetic field that initiates this relative motion which transfers the power to the shaft.

For a variety of reasons an electrical machine may have a centrifugal switch that is used to either electrically engage or electrically disengage a circuit when a certain rotational speed is obtained. Such switches typically have a mechanical component or components that are urged radially outward by centrifugal forces that increase as the rotational speed increase. The centrifugal forces move contacts in the electrical circuit either into engagement or disengagement when the rotational speed reaches a certain level. The mechanical components that move the contacts are expensive and are subject to mechanical wear.

One such centrifugal switch is used in induction motors to disengage the start winding once the motor has obtained a sufficiently high rotational speed that the run windings can properly power the motor. Such a sufficient motor speed may be, for example about 70% of the maximum motor speed.

The present invention is directed to alleviate at least some of these problems with the prior art.

BRIEF DESCRIPTION OF THE INVENTION

A switch according to the present invention may be used in an electric machine that is typically in the form of an electric generator or an electric motor. The motor includes a housing and a centrally located rotor that rotates relative to and is secured to the housing. The motor also includes a stator secured to the housing. The stator includes a plurality of spaced apart teeth extending inwardly. The stator also includes wire formed into a plurality of coils, each of the plurality of coils wrapped around one of the plurality of teeth.

For example, the motor may be in the form of an induction, capacitive start, motor. The motor includes a first set of coils that is used to operate the motor in a run mode and a second set of coils that is electrically connected to a start capacitor that is used to operate the motor in a start mode. Once the motor reaches 70% of the motor maximum speed, the start coils are deenergized with, for example, an electrical device or switch, for example, the centrifugal switch of the present invention.

According to an aspect of the present invention, an electrical switch for use in an electric machine may include a first member securable to the rotor and rotatable with the rotor. The switch may also include a second member slidably securable to the body and configured to be moveable with respect to the first member in a direction parallel to the axis of rotation of the rotor. The first member and the second member are either magnetically attracted toward or magnetically repelled from each other.

The switch may also include a first electrically conductive member cooperable with the second member and moveable in a direction parallel to the axis of rotation of the rotor from a first axial position to a second axial position, spaced from the first axial position. The second member may be adapted to urge the first electrically conductive member from the first axial position to the second axial position.

The switch may also include a second electrically conductive member spaced from the first electrically conductive member when the first electrically conductive member is in the first axial position and electrically engaged with the first electrically conductive member when the first electrically conductive member is in the second axial position. The first member may have a least a portion thereof having a center of mass moveable from a first radial distance from the axis of rotation of the rotor when the rotor rotates at a first rotational speed to a second radial distance from the axis of rotation of the rotor when the rotor rotates at a second rotational speed different than the first rotational speed. The second radial distance is different than the first radial distance.

Magnetic attraction or magnetic repulsion may cause the first member and the second member to be either magnetically attracted toward each other or magnetically repelled away from each other to cause to cause the second member to either engage and disengage the first electrically conductive member with the second electrically conductive member when the rotor reaches the second rotational speed.

According to an aspect of the invention, the electrical switch may be configured such that the first member and the second member are magnetically repelled by each other.

According to another aspect of the invention, the electrical switch may be configured such that at least one of a portion of the first member and a portion of the second member includes a magnet.

According to another aspect of the invention, the electrical switch may be configured such that the first member includes a base fixedly secured to the end of the rotor, an arm having an end extending from the base at least partially in a direction parallel to the axis of rotation of the rotor, and one of a magnet and a ferrous material connected to the end of the arm and spaced from the base.

According to another aspect of the invention. the electrical switch may be configured such that the first member includes a plurality of spaced apart arms, each arm having a first end thereof and one of a magnet and a ferrous material connected to the first end of each of the plurality of arms.

According to another aspect of the invention, the electrical switch may be configured such that wherein each of the spaced apart arms are equally spaced apart with respect to the axis of rotation of the rotor.

According to another aspect of the invention, the electrical switch may be configured such that the second member includes a first component fixedly secured to the body a second component slidably secured to the first component, and one of a magnet and a ferrous material secured to the second component.

According to another aspect of the invention, the electrical switch may be configured such that the first component includes a cylindrical sleeve; and wherein the second component includes a cylindrical rod.

According to another aspect of the invention, the electrical switch may be configured such that the first electrically conductive member includes a resilient metal having a first end connected to the body and a second cantilevered end engagable with the second member and wherein the second electrically conductive member includes a resilient metal having a first end connected to the body and a second cantilevered end engagable with the first electrically conductive member.

According another aspect of the invention, the electrical switch may be configured such that the first member includes a first component including a base fixedly secured to the end of the rotor, first and second legs, each leg extending at least partially axially outwardly from one of the distal ends of the planar base and first and second planar arms extending at least partially radially inwardly from the distal ends of the legs, one of a magnet and a ferrous material connected to the first arm, and the other of one of a magnet and a ferrous material connected to the second arm.

According to another aspect of the invention, the electrical switch may be configured such that the ferrous material is permanently magnetized.

According to another aspect of the invention, the electrical switch may be configured such that the first component is made from a plurality of individual members, wherein the first arm is connected to the first leg by a mechanical hinge, and further including a spring connected to the first leg and to the second arm, the spring adapted to permit the first arm to move outwardly about the hinge when the rotor is rotated.

According to another aspect of the invention, the electrical switch may be configured such that the first member includes a first member magnet; and further including a third member including a third member magnet, the third member connected to the first member, the third member magnet positioned farther than first member magnet from the second member.

According to another aspect of the invention. the electrical switch may be configured such that the first member includes an integral metal component having a planar base fixedly secured to the end of the rotor, first and second planar legs, each leg extending at least partially axially outwardly from one of the distal ends of the planar base and first and second planar arms extending at least partially radially inwardly from the distal ends of the planar legs, a first magnet connected to the first arm, and a second magnet connected to the second arm.

According to another aspect of the invention. the electrical switch may further include a third magnet positioned on the planar base of the component.

According to another aspect of the invention, the electrical switch may be configured such that the first member includes a plurality of spaced apart arcuate magnet portions spaced from the axis of rotation of the rotor and wherein the second member has a centerline parallel to and spaced from the axis of rotation of the rotor.

According to an aspect of the invention, an electric machine may be provided. The machine includes a housing, a stator and a rotor. The housing has an inner surface defining a cavity therein. The stator is secured to the housing. The rotor is rotatably secured to the housing and defines an axis of rotation thereof. The machine also includes a centrifugal switch including a first member securable to the rotor and rotatable therewith and a second member slidably securable to the body and configured to be moveable with respect to the first member in a direction parallel to the axis of rotation of the rotor. The first member and the second member are one of magnetically attracted toward or magnetically repelled from each other. The machine also includes a first electrically conductive member cooperable with the second member moveable in a direction parallel to the axis of rotation of the rotor from a first axial position to a second axial position, spaced from the first axial position. The second member is adapted to urge the first electrically conductive member from the first axial position to the second axial position.

The machine also includes a second electrically conductive member spaced from the first electrically conductive member when the first electrically conductive member is in the first axial position and electrically engaged with the first electrically conductive member when the first electrically conductive member is in the second axial position.

The first member has a least a portion thereof having a center of mass moveable from a first radial distance from the axis of rotation of the rotor when the rotor rotates at a first rotational speed to a second radial distance from the axis of rotation of the rotor when the rotor rotates at a second rotational speed different than the first rotational speed. The second radial distance is different than the first radial distance.

One of the of magnetic attraction and the magnetic repulsion causes the first member and the second member to be one of magnetically attracted toward each other or magnetically repelled away from each other to cause to cause the second member to one of engage and disengage the first electrically conductive member with the second electrically conductive member when the rotor reaches the second rotational speed.

According to another aspect of the invention, the electrical machine may be configured such that the first member and the second member are magnetically repelled by each other.

According to an aspect of the invention the electrical machine may be configured such that at least one of a portion of the first member and a portion of the second member includes a magnet.

According to an aspect of the invention a method for transmitting an electrical signal in an electric machine once a certain rotation speed has been obtained is provided. The method includes the steps of providing a housing, securing a stator to the housing, and rotatably securing a rotor to the housing. The rotor defines an axis of rotation thereof.

The method also includes the steps of providing a centrifugal switch, securing a first member to the rotor, and slidably securing a second member to the housing.

The method also includes the steps of configuring the second member to be moveable with respect to the first member in a direction parallel to the axis of rotation of the rotor, adapting the first member and the second member to be one of magnetically attracted toward or magnetically repelled from each other, and providing a first electrically conductive member.

The method also includes the steps of using the second member to selectively move the first electrically conductive member from the first axial position to the second axial position, providing a second electrically conductive member spaced from the first electrically conductive member when the first electrically conductive member is in the first axial position, and electrically engaging with the first electrically conductive member to the second electrically conductive member when the first electrically conductive member is in the second axial position.

The method includes the steps of providing a portion of the first member having a center of mass moveable from a first radial distance from the axis of rotation of the rotor when the rotor rotates at a first rotational speed to a second radial distance from the axis of rotation of the rotor when the rotor rotates at a second rotational speed different than the first rotational speed, the second radial distance being different than the first radial distance.

The method also includes the steps of utilizing one of the of magnetic attraction and the magnetic repulsion to cause one of the first member and the second member to be one of magnetically attracted toward each other or magnetically repelled away from each other to cause the second member to engage the first electrically conductive member with the second electrically conductive member when the rotor reaches one of the first rotational speed and the second rotational speed. The inner cavity is generally cylindrical and wherein the moisture guide is generally planar.

BRIEF DESCRIPTION OF THE DRAWINGS

FIG. 3 is partial perspective view of the electric device of FIG. 2 with the motor at a second or third rotational speed, faster than the first rotational speed and with the device in a second state;

DETAILED DESCRIPTION OF THE INVENTION

Figure 1:
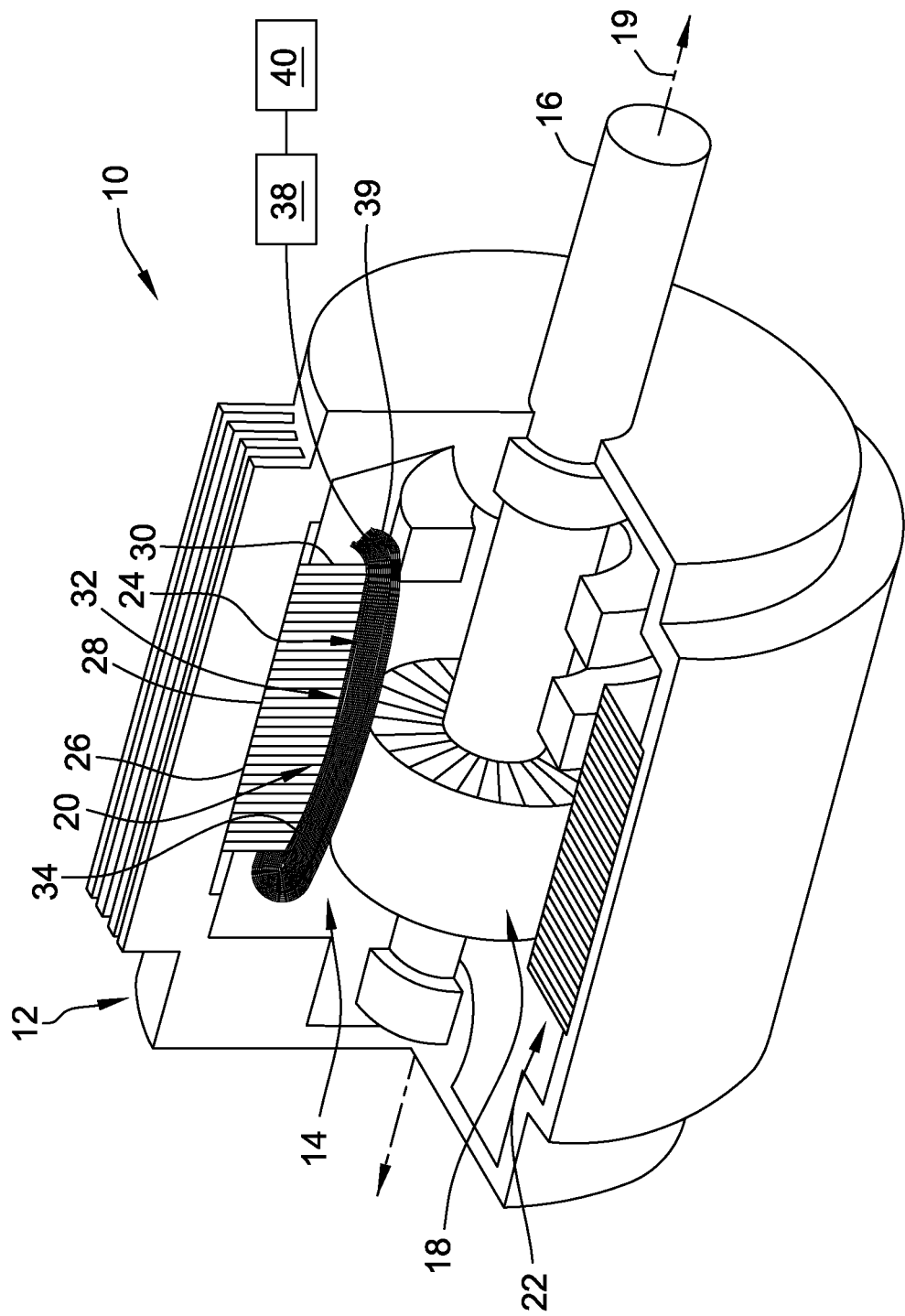
FIG. 1 is a perspective view partially in cross-section of an electric motor according to an embodiment of the present invention.

Referring to FIG. 1, an electric machine 10 for which a switch according to the present invention may used is shown. The electric machine 10 is typically in the form of an electric generator or an electric motor. For expediency the machine 10 will be described hereinafter as a motor 10. It should be appreciated that a motor may operate as a generator and vice versa. The electric machine or motor 10 includes a housing 12. The housing 12 has an inner surface defining a cavity 14 therein.

Typically, the motor 10 includes a centrally located shaft 16 that rotates relative to the housing 12. The electric machine also includes a rotor 18. Typically, and as shown in FIG. 1, the rotor 18 includes the shaft 16 to which a load, not shown, is typically directly or indirectly secured. As shown, the rotor 18 is rotatably secured to the housing 12.

As shown in FIG. 1, the motor 10 includes a stator 20 secured to the housing 12. The stator 20 includes a stator body 22 that has a generally circular outer periphery 24 and a generally circular inner periphery 26, spaced from the outer periphery 24.

While the body 22 may be made of various suitable materials, may be unitary or made from multiple components, as shown in FIG. 1, typically, the body 22 is made from a plurality of sheets or laminations 28. The laminations 28 are typically made of a magnetically conductive material, for example, of a ferrous material or a magnetically conductive composite. Each of the laminations 28 includes a plurality of spaced apart teeth 30 extending inwardly from the circular inner periphery 26.

The stator 20 also includes wire 39 formed into a plurality of coils 34, each of the plurality of coils 34 is wrapped around one of the plurality of teeth 30.

Note that the above description of the motor 10 is for a radial flux motor. It should be appreciated that the actuator of the present invention may be utilized with an axial flux motor with or without a rotor shaft. Such an axial flux motor is more fully described in U.S. Pat. No. 3,568,978 A, hereby incorporated in its entirety by reference.

For the induction, capacitive start, motor 10, the motor includes a first set 32 of coils 34 that is used to operate the motor in a run mode and a second set 36 of coils 34 that are electrically connected to a start capacitor 38 that is used to operate the motor in a start mode. Once the motor reaches 70% of the motor maximum speed, the start coils are deenergized with, for example, the centrifugal switch of the present invention.

Figure 2:
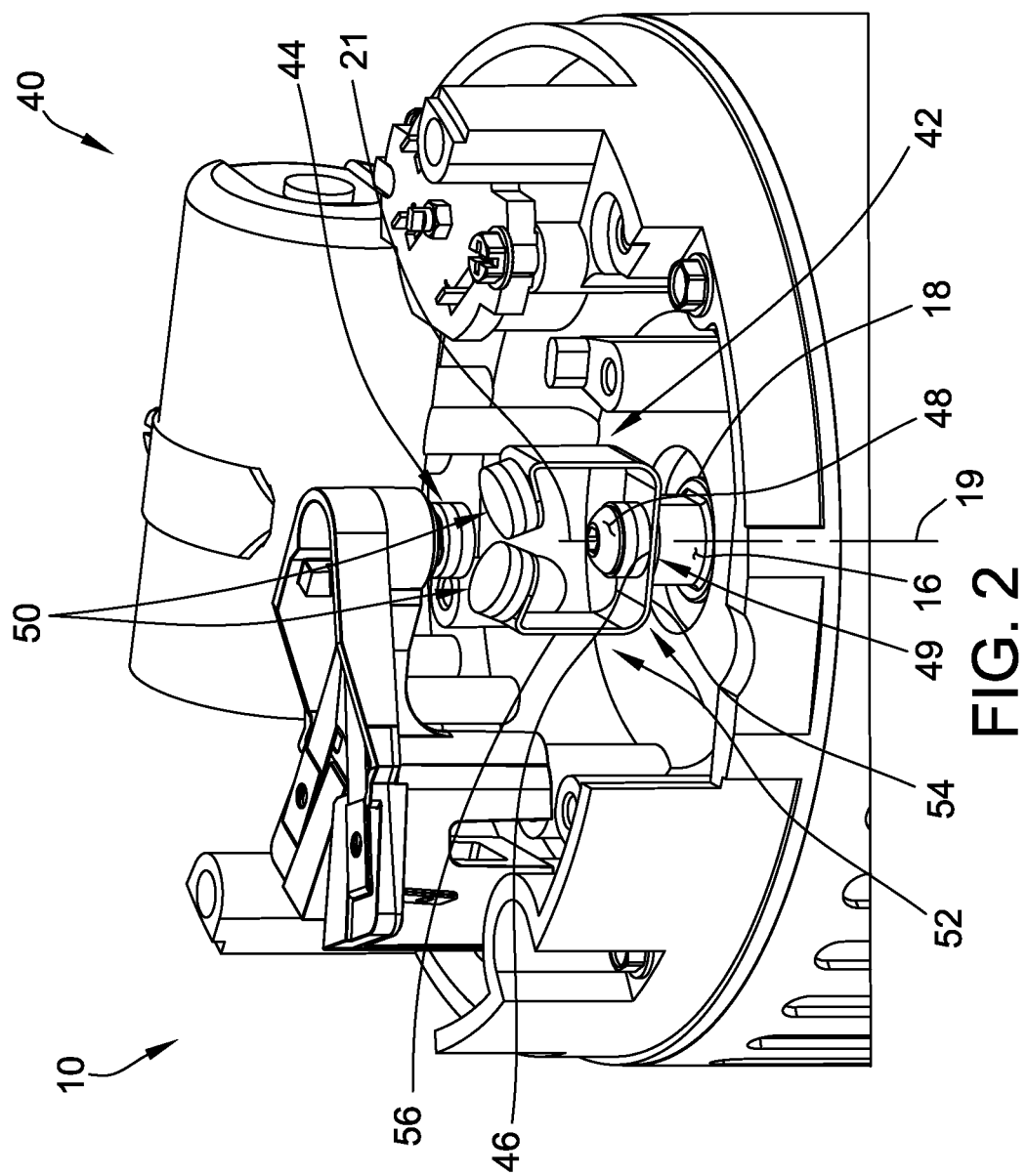
FIG. 2 is partial perspective view of the electric device of FIG. 2 of an electric device according to an embodiment of the present invention installed in the electric motor of FIG. 1 with the motor with the motor at a first or zero rotational speed and with the device in a first state.

According to an aspect of the present invention and referring now to FIG. 2, an electrical switch 40 for use in electric machine 10 may include a first member 42 securable to the rotor 18 and rotatable with the rotor 18. The switch 40 may also include a second member 44 slidably securable to the housing 12 and configured to be moveable with respect to the first member 42 in a direction parallel to axis of rotation 19 of the rotor 18. The first member 42 and the second member 44 are either magnetically attracted toward or magnetically repelled from each other.

As shown in FIG. 2, The first member 42 nay be attached to the rotor 18. As shown in FIG. 2, the first member 42 is attached to an end 46 of the shaft 16. The first member 42, as shown, may be attached along axis of rotation 19. Placing the first member along the axis 19 minimizes any out of balance forces on the rotating rotor 18.

To further minimize any out of balance forces on the rotating rotor 18, the first member has first member centerline 21 which is preferably coincident with the axis of rotation 19 of rotor 18.

The first member may be secured to the shaft 16 and/or rotor 18 by a centrally located screw 48 attached by internal threads 49 formed in shaft 16. Alternatively, the first member may be secured by welding, adhesives or by an interference fit to shaft or rotor.

To provide the magnetic attraction or repulsion, the first member 42 or the second member 44, or both, may include a magnet which provides for the magnetic attraction or repulsion. The magnet may be permanent magnet. The magnet may be a ferrite magnet or a rare earth magnet, including, for example a neodymium magnet.

As shown in FIG. 2, the first member 42 may have any shape and be made of any suitable materials capable of being securable to the rotor 18 and rotatable with the rotor 18.

The first member 42, as shown in FIG. 2, may have a portion thereof in the form of a first member magnet 50.

It should be appreciated that the first member magnet 42 may be in the form of a unitary magnet, a cluster of adjacent magnets or a group of spaced apart magnets.

Note that the first member 42 may alternatively not include a magnet, but only a ferrous material and the second member 44 would then include a magnet that cooperates with the ferrous material of the first member 42.

The first member magnet 50 may be permanent magnet. The first member magnet 50 may be a ferrite magnet or a rare earth magnet, including, for example a neodymium magnet.

The first member magnet 50 may have any suitable shape. For example, the first magnet may be cylindrical, rectangular, square, polygon or any other regular or irregular shape. As shown in FIG. 2, the first member magnet 50 is cylindrical.

As shown in FIG. 2, the first member 42 may include a base 52 for supporting the first member magnet 50. The base 52 may be integral with the magnet 50 or be made of a different material.

As shown and according to an aspect of the invention the base 52 may be made of a resilient material. The resilient material may be, for example, a metal, a polymer or a composite. The base 52 may include a mounting portion 54 for mounting the base 52 onto the shaft 16 or the rotor 18. As shown in FIG. 2, the base may include one or more arms 56 extending from the mounting portion 54.

Figure 3A:
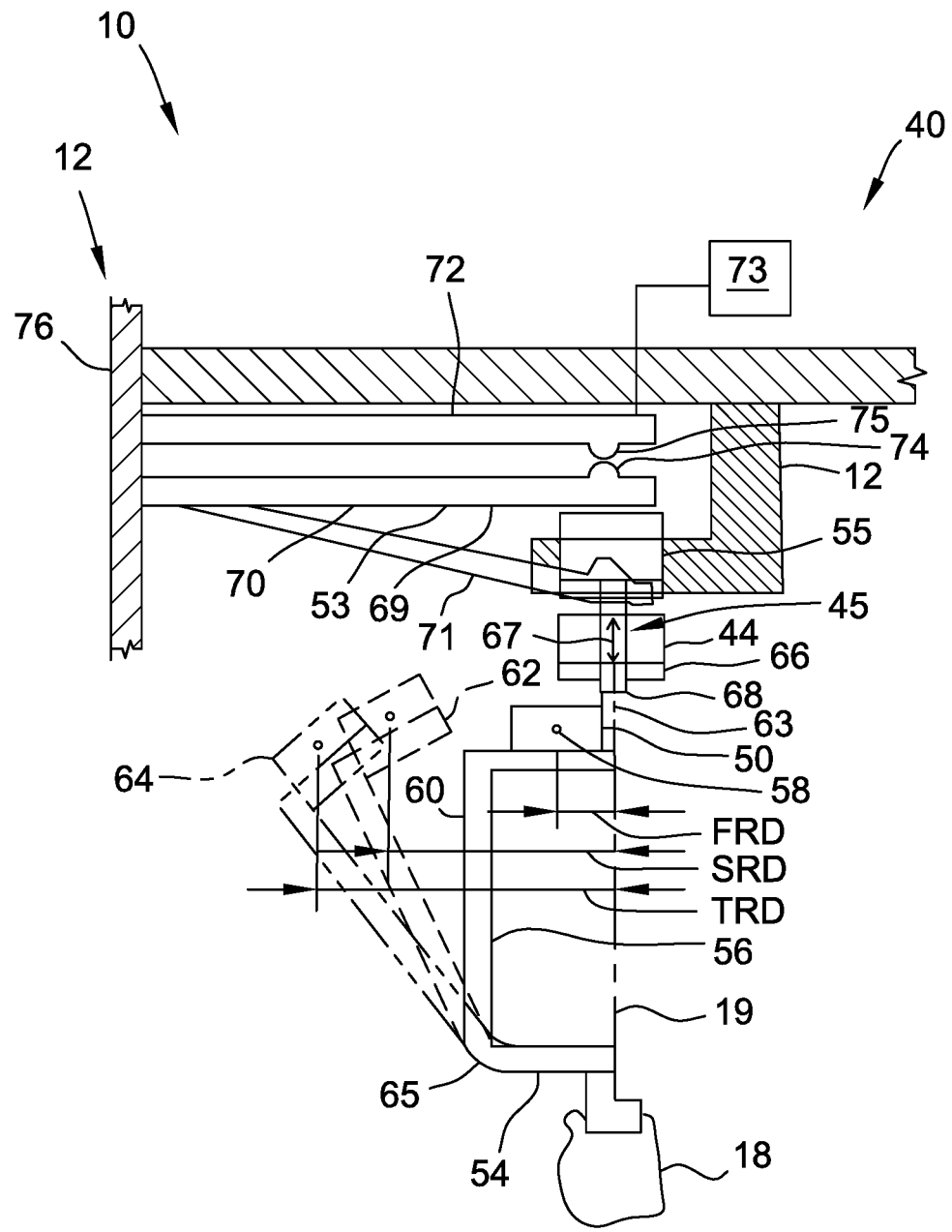
FIG. 3A is partial plan view of the electric device of FIG. 2 showing the first member base in a first rotational speed position in solid lines, in a second rotational speed position in dashed lines and in a third rotational speed position in phantom lines.

Referring now to FIG. 3A, the first member magnet 50 has a center of mass 58 moveable from a first radial distance FRD from the axis of rotation 19 of the rotor 18 when the rotor 18 rotates at a first rotational speed FRS to a second radial distance SRD from the axis of rotation 19 of the rotor 18 when the rotor 18 rotates at a second rotational speed SRS different than the first rotational speed FRS. For example and as shown in FIG. 3A, the first radial distance FRD may occur when the first rotational speed FRS is a zero rotational speed ZRS.

To have the center of mass 58 move and according to an aspect of the invention, the base 52 is resilient so that the centrifugal force of the first member magnet 50 urges the magnet 50 radially outwardly an increasing distance from the axis of rotation 19 of the rotor 18 as the rotational speed of the rotor increases.

For example and as is shown in FIG. 3A, the arm 56 and the mounting portion 54 may be made of a resilient material such that when the rotor 18 is stationary or at the first rotational speed FRS or at the zero rotational speed ZRS, the arm 56 and the mounting portion 54 are in a stationary or first rotational speed position 60 as shown in solid.

As the rotor 18 begins to rotate and angularly accelerate, the centrifugal forces on the first member 42 cause the center of mass 58 to move from first radial distance FRD from axis of rotation 19 of rotor 18 at the first rotational position 60 to second radial distance SRD from axis of rotation 19 of rotor 18 at second rotational speed position 62 as shown in dashed lines when the rotor obtains a second rotational speed SRS.

As the rotor 18 continues to rotate and angularly accelerate, the centrifugal forces on the first member 42 cause the center of mass 58 to move from second radial distance SRD from axis of rotation 19 of rotor 18 at second speed position 62 to third radial distance TRD from axis of rotation 19 at third rotational speed position 64 as shown in phantom lines when the rotor 18 obtains a third rotational speed TRS.

According to an aspect of the invention, once the rotor 18 obtains the third rotational speed TRS, the first member 42 cooperates with the second member 44 to either magnetically attract or magnetically repel each other. This magnetic attraction or magnetic repulsion causes the electrical switch 40 of the present invention to be tripped.

For the magnetic repulsion shown in FIGS. 1-5, the tripping at the third rotational speed position 64 is a tripping of a circuit that become "open" or prohibits electricity to be conducted. For example, the tripping can occur when third rotational speed TRS is 70% of the maximum rotor speed. At that 70% of the maximum rotor speed the second set or starter coil set 36 may be deenergized by the tripping of electrical switch 40 or prohibiting electricity to be conducted to the second set or starter coil set 36.

It should be appreciated that the third rotational speed TRS may be any percentage of the maximum rotor speed and that the obtaining of the third rotational speed TRS may trip the electrical switch 40 to accomplish any desired change to the motor, for example to remove power from the motor once a maximum rotor speed is exceeded.

It should be appreciated that the first member 42 may be configured to flex or move to permit the changing of the distance from the center of mass of the magnet 50 to the axis of rotation 19 of rotor 18 by any shape or configuration possible to permit this flexing. For example, the mounting portion 54 may be generally rigidly positioned on shaft 16 by the screw 48 connected to the shaft 16. The arm 56 may flex and/or a living hinge 65 between the arm 56 and the mounting portion 54 may flex to permit the required movement of the magnet 50. The living hinge 65 may have the same thickness as the arm 56 or the mounting portion 54 or may have a thinner thickness to provide for most of the flexing in the living hinge 65.

As shown in FIGS. 1-5, the switch 40 may also include the second member 44 slidably securable to the housing 12 and is configured to be moveable with respect to the first member 42 in a direction parallel to axis of rotation 19 of the rotor 18. As the center of mass 58 of the first member magnet 50 decrease its distance from the axis of rotation 19 of rotor 18, the first member magnet 50 becomes radially closer to the second member 44.

It should be appreciated that the first member 42 and the second member 44 may either repel each other or attract each other. The switch 40 of FIGS. 1-5 utilizes the first member 42 that repels the second member 44.

Figure 4:
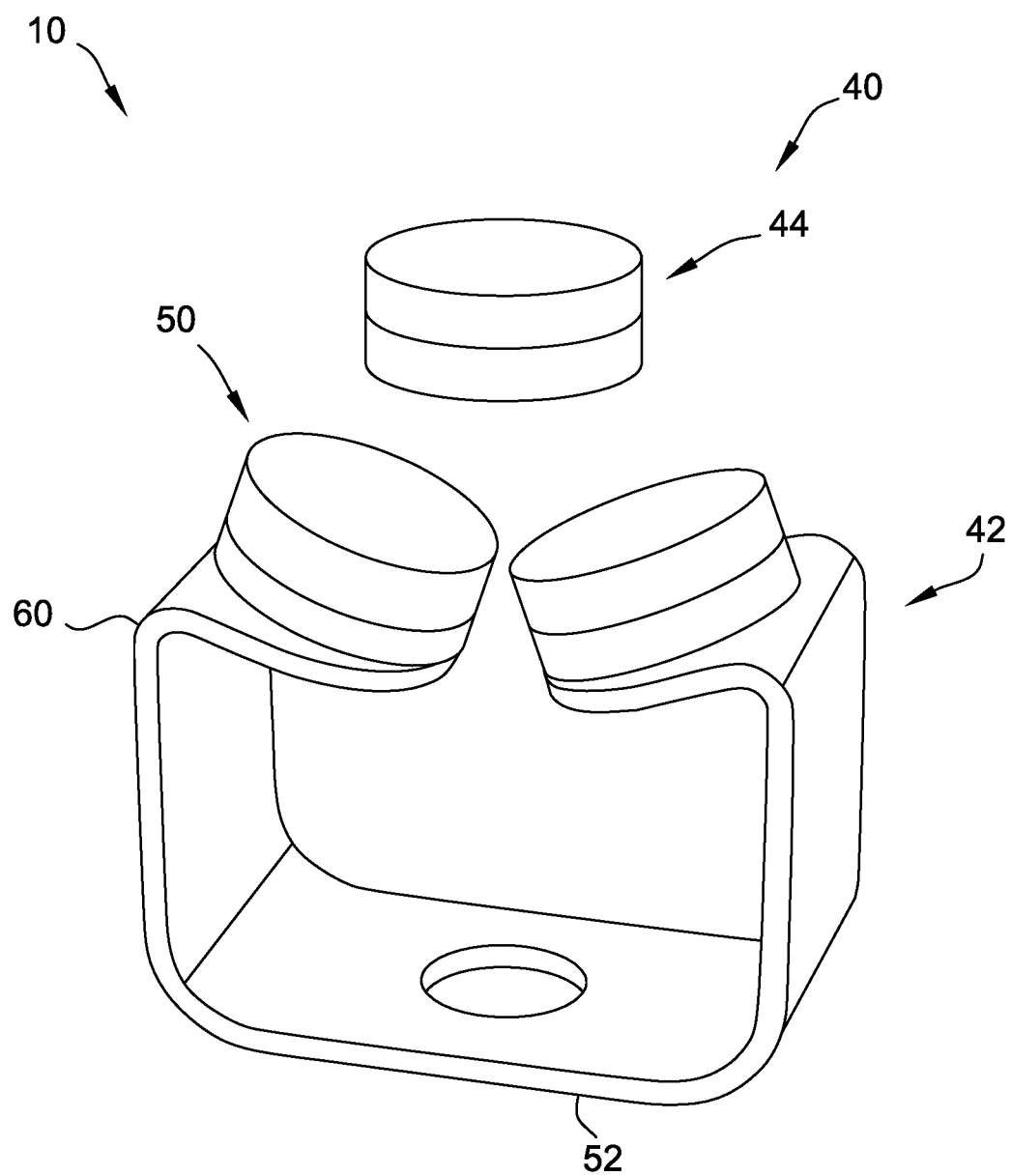
FIG. 4 is partial perspective view of a magnet and bracket assembly for use in the electric device of FIG. 3 with the lower magnets close together to urge the upper magnet upwardly.
Figure 5:
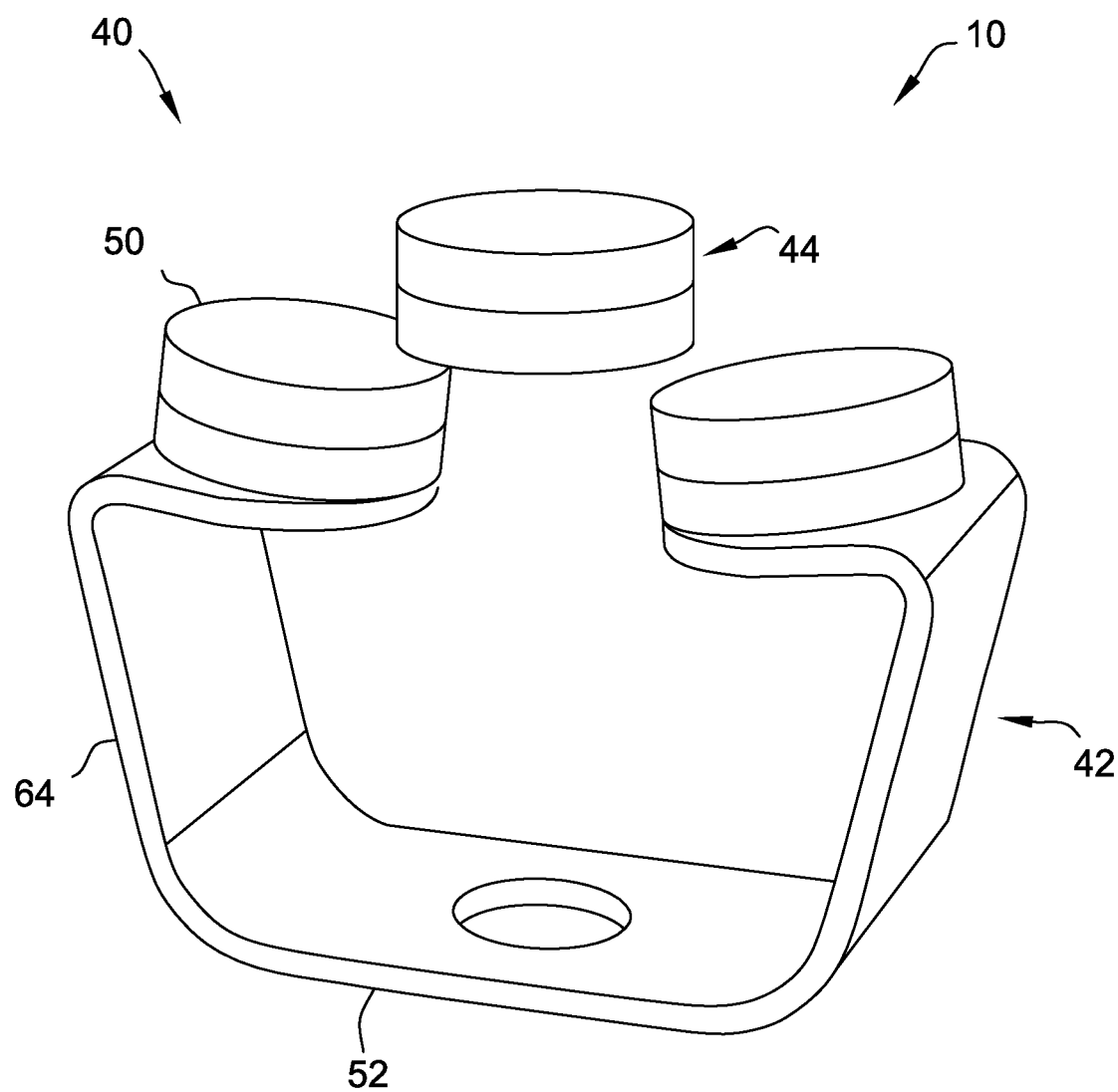
FIG. 5 is partial perspective view of the magnet and bracket assembly of FIG. 3 with the lower magnets moved apart by centrifugal force to permit the upper magnet to move downwardly.

The second member 44 as shown in FIGS. 3-5 includes a second member magnet 66. It should be appreciated that the second member magnet 66 may be in the form of a unitary magnet, a cluster of adjacent magnets or a group of spaced apart magnets.

It should be appreciated that the present invention may be practiced with only a first member magnet or a second member magnet with the other member having a ferrous material that may attract or repel the other member.

As shown in FIG. 3A, the second member 44 is movable along a path as shown by arrows 67 constrained by, for example, a stem 68 secured to the housing 12. This movement can be accomplished by any suitable mechanism providing the restrained path.

As shown in FIG. 3A, the first member 42 urges the second member 44 upwardly into stationary or upward position 55 as shown in solid when the rotor 18 is stationary. The actuator 40 also includes a downward urging device 53 to urge the second member 44 downwardly to trip position when the rotor 18 rotates sufficiently to trip the actuator 40. When the rotor 18 is stationary the magnetic repulsion force between the first member 42 and the second member 44 is greater than the force of the downward urging device 53 so that the second member 44 is in stationary or upward position 55. When the rotor 18 rotates sufficiently to trip the actuator 40, the magnetic repulsion force between the first member 42 and the second member 44 is less than the force of the downward urging device 53 so that the second member 44 is in trip or downward position 57, as shown in dashed lines.

The downward urging device 53 may be a spring, a sponge or gravity. The downward urging device 53 for the actuator 40 of FIGS. 1-5 is in the form of a first electrically conductive member 69, which will be discussed in greater detail below.

For example and as shown in FIG. 3A, the stem 68 is mounted to housing 12 and extends in axis 63 that may, as shown, be coincident with the axis of rotation 19 of rotor 18. It should be appreciated that the present invention may be practiced with the stem extending in a direction skewed to the axis of rotation 19 or in a direction parallel and spaced from the axis of rotation 19 of rotor 18.

As shown in FIG. 3A as the first member 42 and first member magnet 50 moves from first rotational position 60 to first position 62 and eventually to second position 64, the magnetic repulsion between the first member 42 and the second member 44 become less than the force of the downward urging device 53 which causes the second member 44 to advance downwardly in the direction of arrows 67 along stem 68. The second member 44 may have a central opening 45 which mates with the periphery of the stem 68. The central opening 45 may be cylindrical or any other suitable shape. a cylindrical sleeve; and wherein the second component includes a cylindrical rod.

The motion of second member 44 downwardly provides the actuation force for the actuator or switch 40 of the present invention. As shown in FIG. 3A, the switch 40 may also include the first electrically conductive member 69 that cooperates with the second member 44. The first electrically conductive member 69 moves in a direction at least partially parallel to the axis 19 of rotation of the rotor 18 from a first axial position 70 as shown in solid to a second axial position 71 as shown in phantom, spaced from the first axial position 70.

The first electrically conductive member 69 may be biased downwardly toward second position 71, so that the movement downwardly of the second member 44 permits the electrically conductive member 69 to move from the first axial position 70 to the second axial position 71. As stated above the first electrically conductive member 69 serves as the downward urging device 53. The magnetic repulsion between the first member 42 and the second member 44 is less than the downwardly urging first electrically conductive member 69, causing the first electrically conductive member 69 to move downwardly. In the first axial position, the first member 42 and the second member 44 are spaced apart and do not contact each other, and the first member magnets 50 are spaced apart and do not contact each other. In the second axial position, the first 42 and the second member 44 are spaced apart and do not contact each other, and the first member magnets 50 are spaced apart and do not contact each other.

Continuing to refer to FIG. 3A, the switch 40 may also include a second electrically conductive member 72 electrically engaged with the first electrically conductive member 69 when the first electrically conductive member 69 is in the first axial position 70 and electrically disengaged with the first electrically conductive member 69 when the first electrically conductive member 69 is in the second axial position 71.

When the second electrically conductive member 72 is electrically disengaged from the first electrically conductive member 69, the switch 40 may be tripped. The switch 40 is electrically connected to an electric circuit 73 to affect the operation of the motor 10. This energizing or tripping may cause the electric motor 10 to operate differently. For example, for the motor 10 if it is a capacitive start induction motor, the tripping may occur when FRS is 70% of the maximum rotor speed and the circuit 73 may be tripped to disconnect power to the second set 36 of coils 34 and may cause the second set 36 of coils 34 or starter coils to be deenergized.

The first electrically conductive member 69 and the second electrically conductive member 72 may have suitable size and shape and may be made of any suitable materials. The first and second members 69 and 72 may be made of copper, aluminum or a composite material. The first and second members 69 and 72 may have first and second contact portions 74 and 75, respectively, for engaging each other. The contact portions may be flat curved, concave and convex, or have any other suitable configuration.

As shown in FIG. 3A, the first electrically conductive member 69 may be in the form of an electrically conductive plate or bar extending in a cantilevered fashion from the housing 12 of motor 10. As shown the housing 12 of motor 10 may include an end cap 76 to which the member 69 is secured. As shown the member 69 extends from end cap 76 in a direction transverse to axis of rotation 19 of rotor 18. The first electrically conductive member 69 may be resilient such that it may be moveable from first axial position 70 to second axial position 71. The member 69 may have a contact portion made of a different or identical material and may have a shape conducive to good electrical conductance from the first member 69 to the second member 72. The first electrically conductive member 69 has a distal portion 77 that engages second member 44.

As shown in FIG. 3A, the second electrically conductive member 72 may be in the form of an electrically conductive plate or bar extending in a cantilevered fashion from the end cap 76 to which the member 72 is secured. As shown the member 72 extends from end cap 76 in a direction transverse to axis of rotation 19 of rotor 18.

The second electrically conductive member 72 may be resilient, but may be rigid as the first electrically conductive member 69 is moveable toward the second electrically conductive member 72. The member 72 may have a contact portion made of a different or identical material and may have a shape conducive to good electrical conductance from the first member 69 to the second member 72.

As shown in FIG. 3A, the contact portion 75 of the first electrically conductive member 70 and the contact portion 76 of the second electrically conductive member 71 may have convex mating surfaces to provide for an electric contact that will have no or minimal arcing as the switch 40 is actuated.

It should be appreciated that the position of the stem, the strength of the downward urging device, the upward position 55 and the downward position 57 of the second member, the first rotational position 60 and the second rotational speed position 64 of the first member, the size and magnetic strength of the first member and the second member 44, as well as the dimensions of the first member base 52, may be modified to obtain the desired tripping or actuation for the actuator 40.

It should be appreciated that the position of the first member and/or that of the second member may be made adjustable so that the trip or actuation speed of the actuator of the present invention may be fine-tuned or adjusted for different motor applications. For example, the magnet may have an eccentric stem (not shown) that may be rotated to adjust magnet position, or the first member base may provide for adjustable magnet mounting (not shown) or for adjustment to arm length or arm flexibility (not shown).

Referring now to FIG. 4, the first member 42, the first member magnet 50, the first member base 52 and the second member 44 are shown in the first rotational position 60.

Referring now to FIG. 5, the first member 42, the first member magnet 50, the first member base 52 and the second member 44 are shown in the second rotational speed position 64.

While the actuator 40 of FIGS. 1-5 has a pair of spaced apart first members 42, it should be appreciated that the actuator of the present invention may be provided with a solitary first member. The use of a plurality of first member spaced evenly about the center of rotation of the motor rotor may provide for smoother operation and for lower bearing loads and fewer balancing and vibration issues. Such problems with a solitary first member need to be balanced against the lower cost of a solitary first member.

Figure 6:
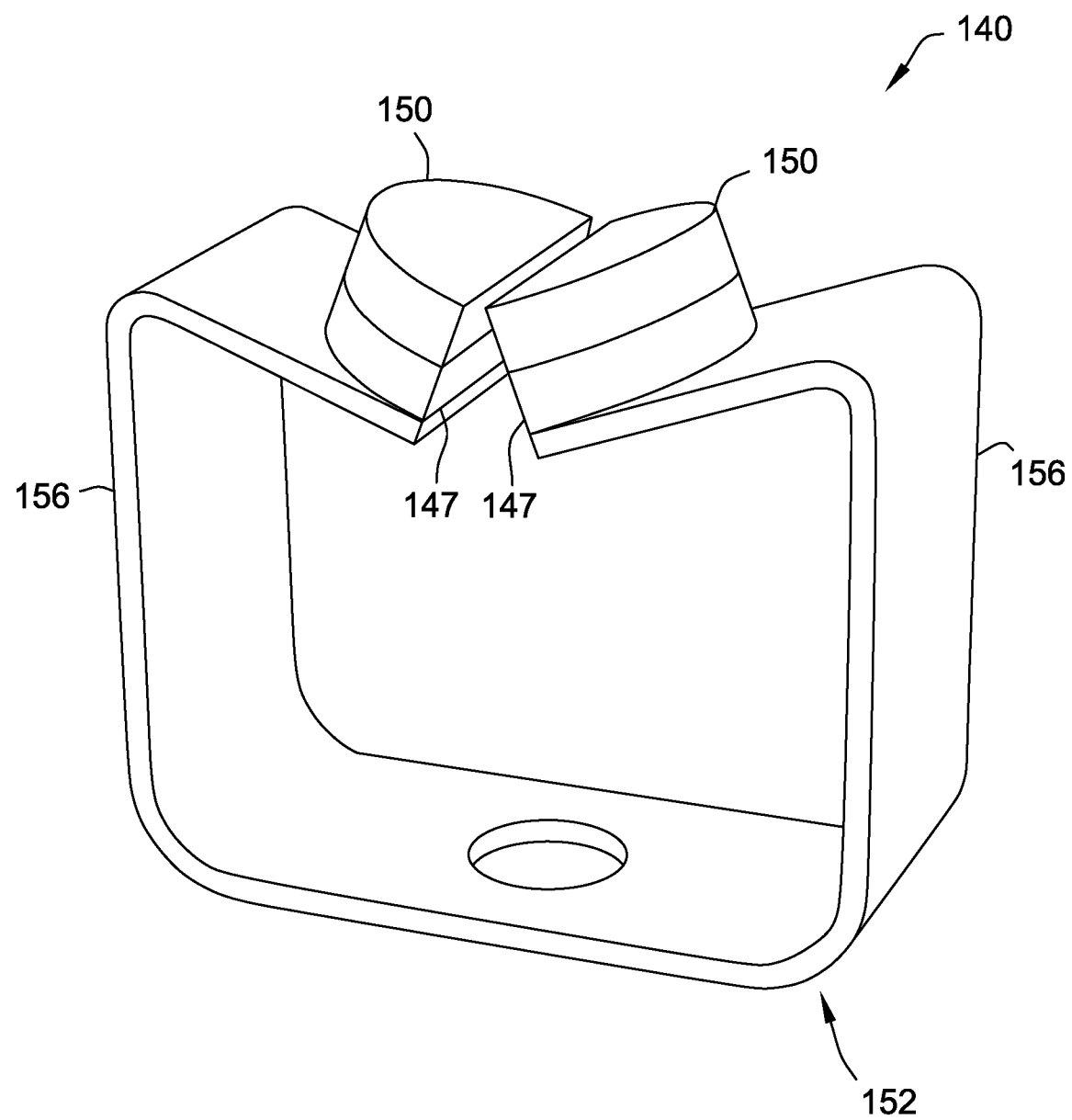
FIG. 6 is a partial perspective view of a magnet and bracket assembly according to another embodiment of the present invention utilizing semi cylindrically shaped magnets.

According to another aspect of the invention and referring now to FIG. 6, electrical switch 140 is shown. Switch 140 is similar to switch 40 of FIGS. 1-5, except first member 142 includes a pair of spaced apart first member magnets 150 that are semi-cylindrically shaped. Each of the magnets 150 are connected to an arm 156 of base 152. Flat surfaces 147 of the magnets 150 are positioned adjacent to each other.

Figure 7:
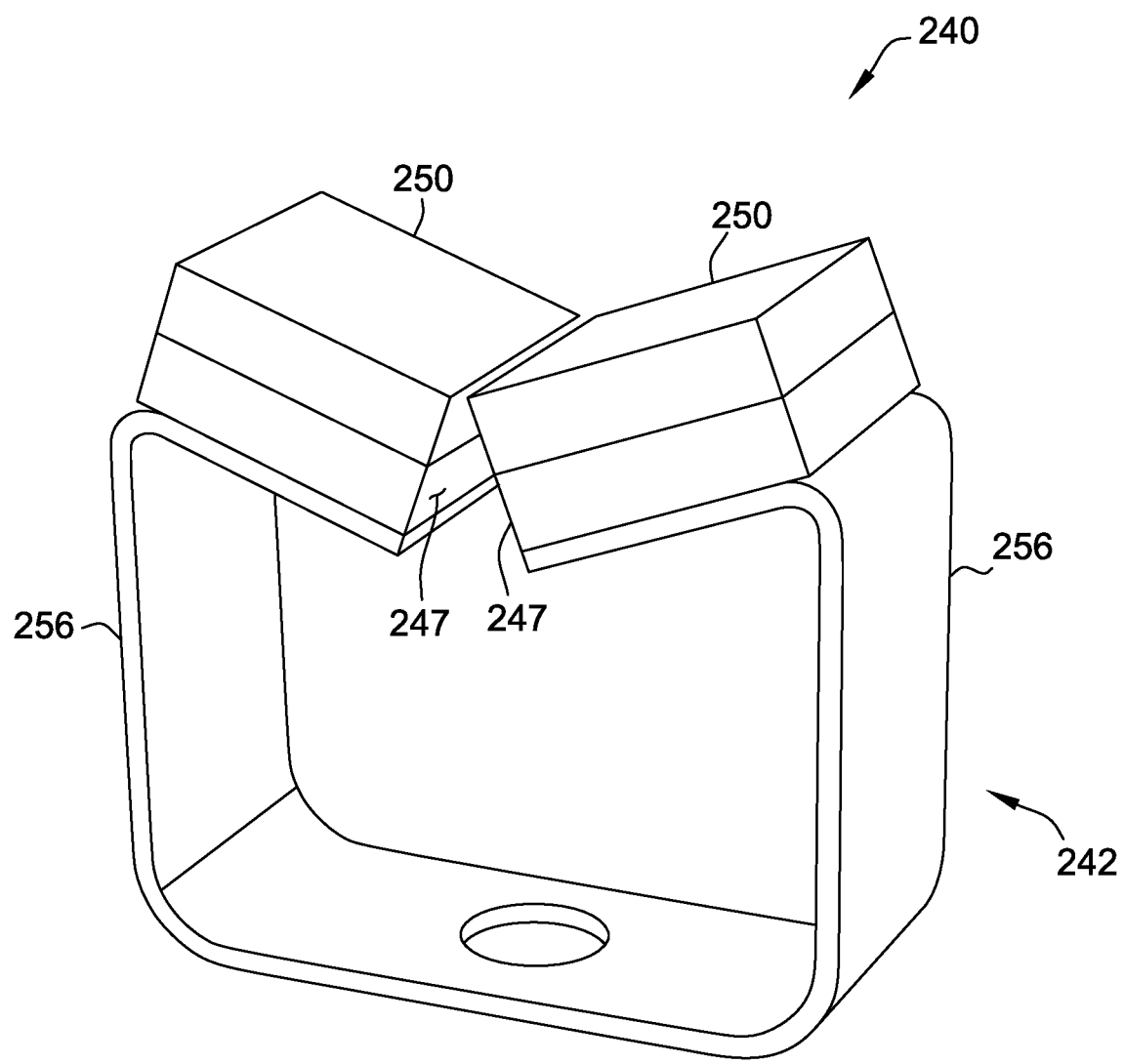
FIG. 7 is a partial perspective view of a magnet and bracket assembly according to another embodiment of the present invention utilizing rectangularly shaped magnets.

According to another aspect of the invention and referring now to FIG. 7, electrical switch 240 is shown. Switch 240 is similar to switch 40 of FIGS. 1-5, except first member 242 includes a pair of spaced apart first member magnets 250 that are rectangularly shaped. Each of the magnets 250 are connected to an arm 256 of base 252. Flat surfaces 247 of the magnets 250 are positioned adjacent to each other.

Figure 8:
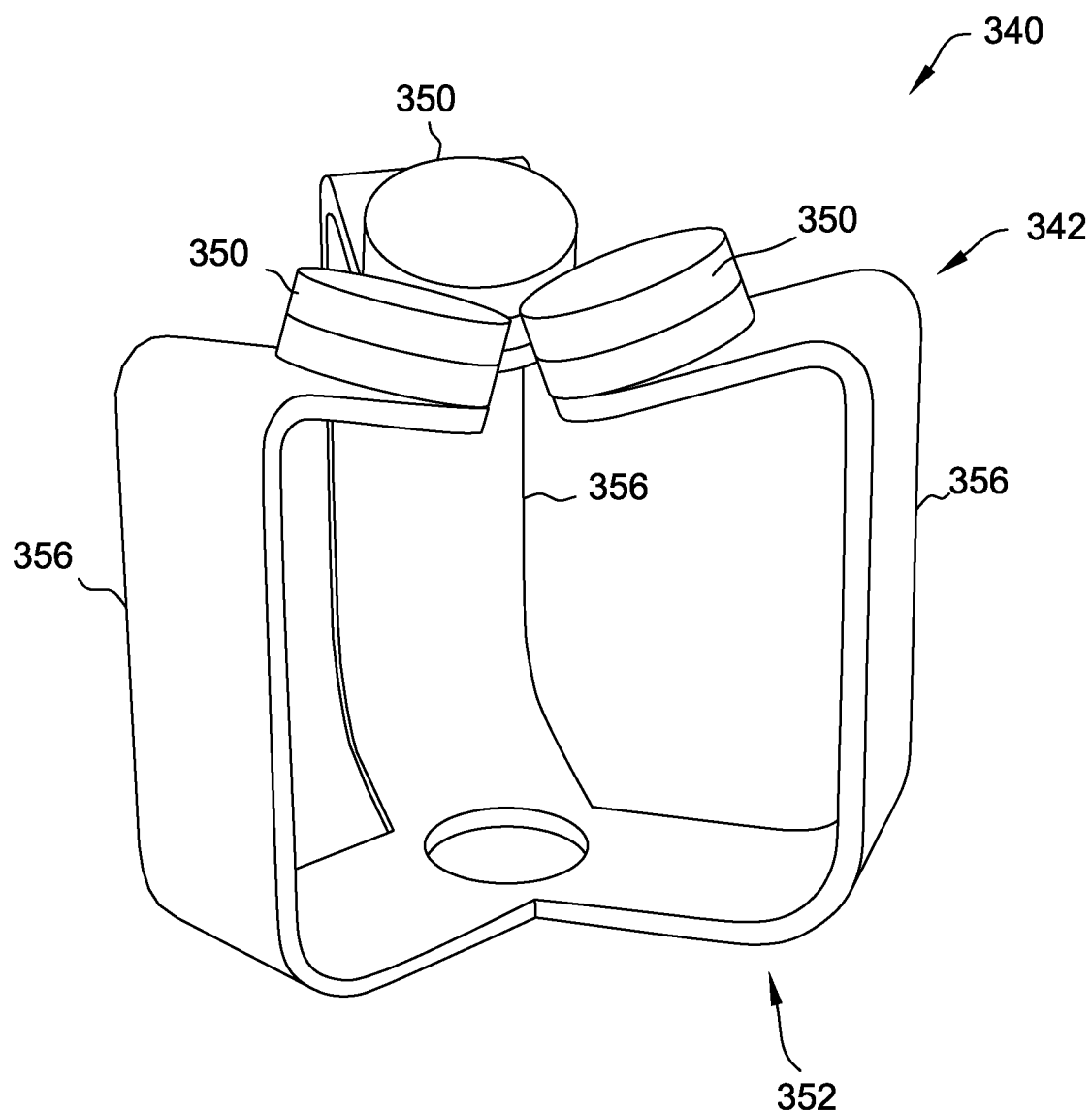
FIG. 8 is a partial perspective view of a magnet and bracket assembly according to another embodiment of the present invention utilizing three cylindrically shaped magnets.

According to another aspect of the invention and referring now to FIG. 8, electrical switch 340 is shown. Switch 340 is similar to switch 40 of FIGS. 1-5, except first member 342 includes three equally of spaced apart first member magnets 350 that are cylindrically shaped. Each of the magnets 250 are connected to one of three arms 356 of base 352.

Figure 9:
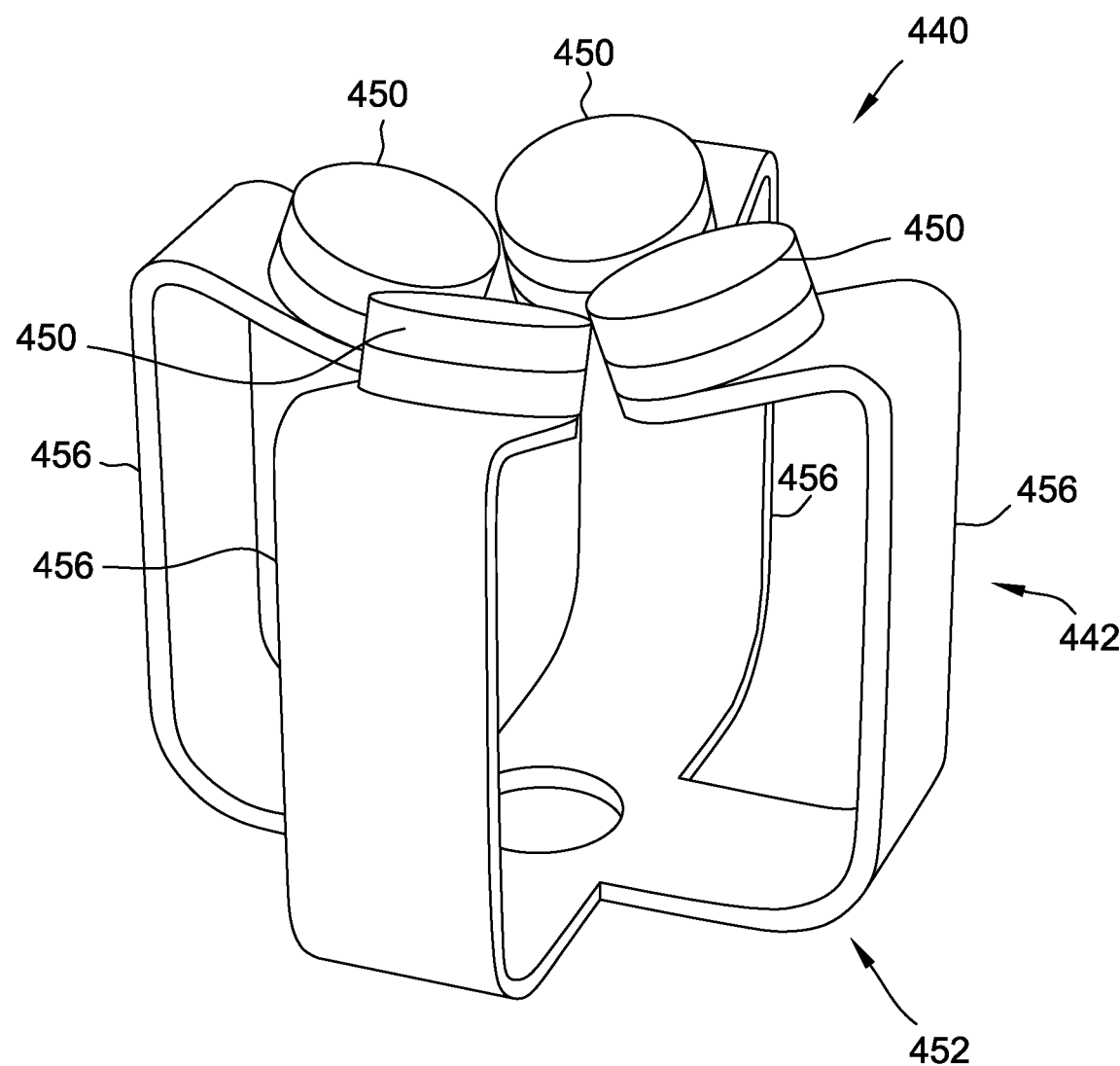
FIG. 9 is a partial perspective view of a magnet and bracket assembly according to another embodiment of the present invention utilizing four cylindrically shaped magnets.

According to another aspect of the invention and referring now to FIG. 9, electrical switch 440 is shown. Switch 440 is similar to switch 40 of FIGS. 1-5, except first member 442 includes four equally of spaced apart first member magnets 450 that are cylindrically shaped. Each of the magnets 450 are connected to one of four arms 456 of base 452.

Figure 10:
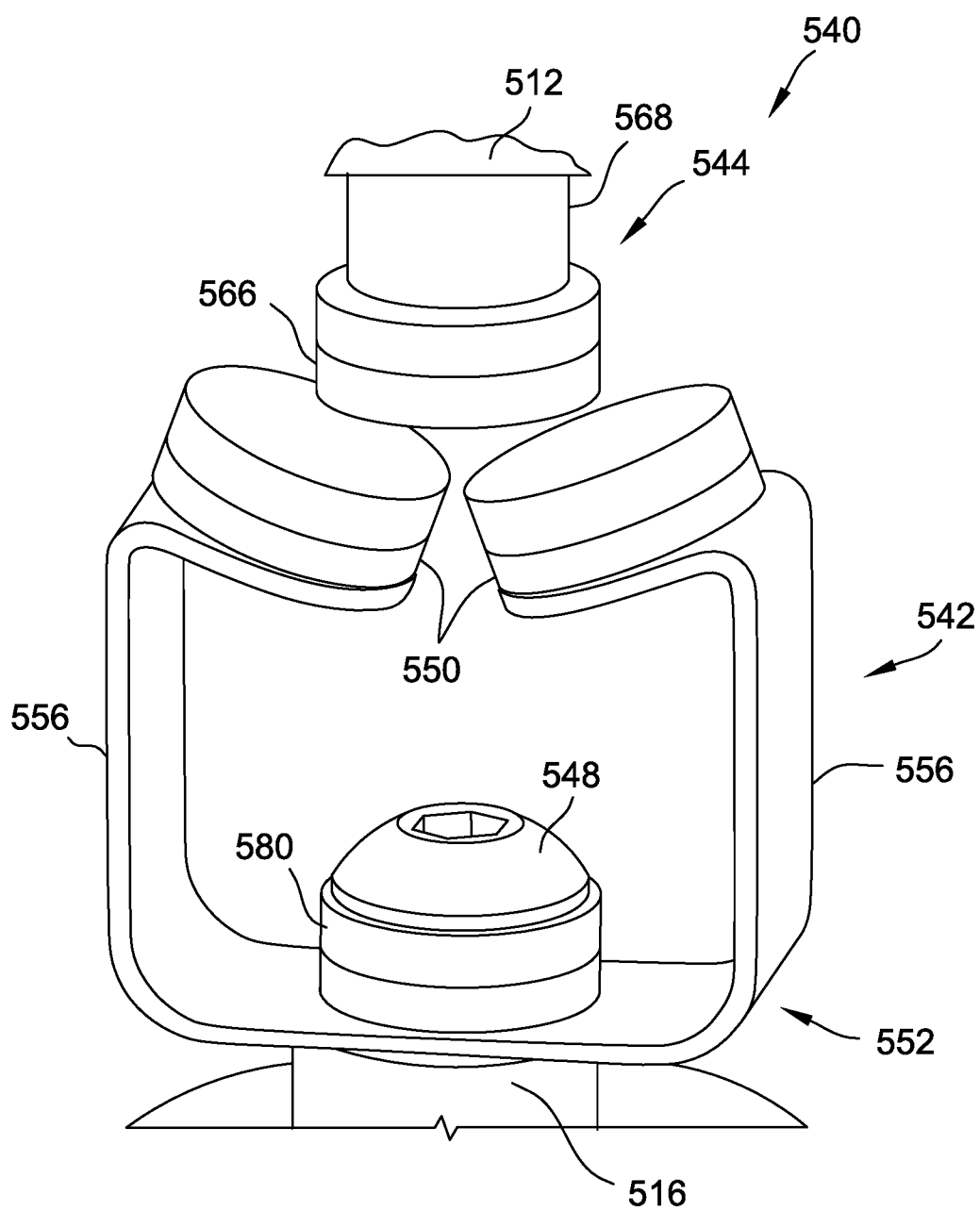
FIG. 10 is a partial perspective view of a magnet and bracket assembly according to another embodiment of the present invention utilizing two cylindrically shaped magnets on the bracket and two cylindrically shaped magnets centrally positioned to cooperate with the magnets on the bracket.

According to another aspect of the invention and referring now to FIG. 10, electrical switch 540 is shown. Switch 540 is similar to switch 40 of FIGS. 1-5, except first member 542 includes two equally of spaced apart first member magnets 550 that are cylindrically shaped. Each of the magnets 550 are connected to one of the two arms 556 of base 552. Second member 544 with a second member magnet 566 is slidably fitted to housing 512 at stem 568 of second member 544.

An additional magnet 580 is secured by screw 548 to shaft 516 and to first member base 552. The additional magnet 580 may be used to attract or repel the second member magnet 566. The additional magnet 580 may provide for more "snap" or more aggressive movement of the first electrically conductive member to the second electrically conductive member to reduce arcing and to prolong the life of the actuator. Note that additional magnet(s) may be position at other locations in the motor, particularly in the first member base to improve this "snap" action. Also, the strength and positioning of the magnets may be adjusted to improve this "snap" action.

Figure 11:
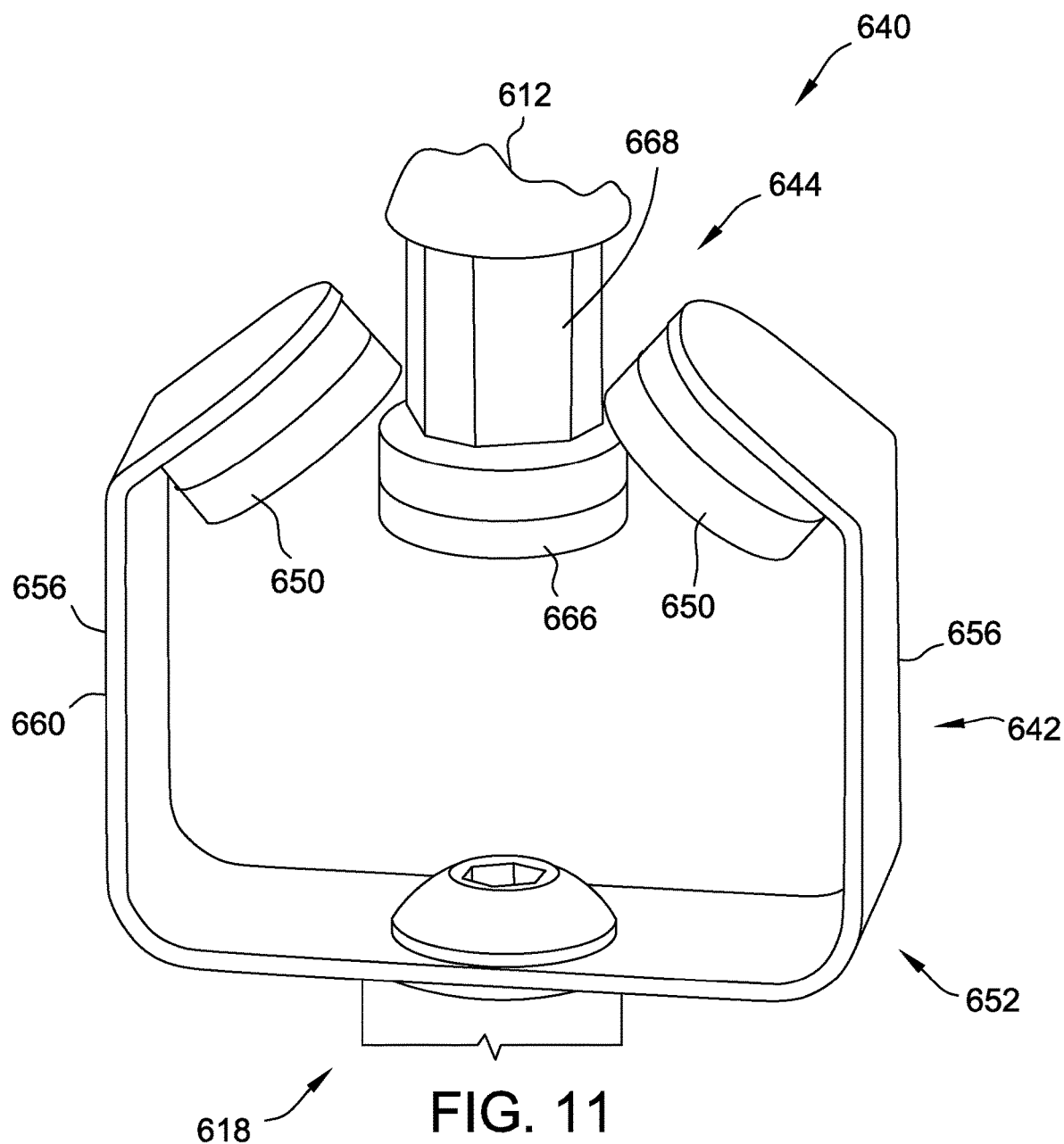
FIG. 11 is a partial perspective view of a magnet and bracket assembly according to another embodiment of the present invention utilizing two cylindrically shaped magnets on the bracket and a third cylindrically shaped magnet centrally positioned, and configured to have the magnets attract each other when cooperating with each other.

According to another aspect of the invention and referring now to FIG. 11, electrical switch 640 is shown. Switch 640 is similar to switch 40 of FIGS. 1-5, except that switch 640 using the magnetic attraction of the first member 642 to the second member 644 to actuate the switch 640. The first member 642 includes two equally of spaced apart first member magnets 650 that are cylindrically shaped. Each of the magnets 650 are connected to one of the two arms 656 of base 652. Second member 644 with a second member magnet 666 is slidably fitted to housing 612 at stem 668 of second member 644. The second member magnet 666 is positioned below the two first member magnets 650.

When in the stationary or zero rotational speed position 660 as shown, the two first member magnets 650 urge second member magnet 666 and the second member 644 upwardly to connect the first electrically conductive member to the second electrically conductive member. As arms 656 of the first member base 652 move outwardly as the rotor 618 rotates, the first member magnets 650 provide less upward magnetic attraction to the second member magnet 666, letting the second member 644 move downwardly permitting the first electrically conductive member to disconnect from the second electrically conductive member.

Figure 12:
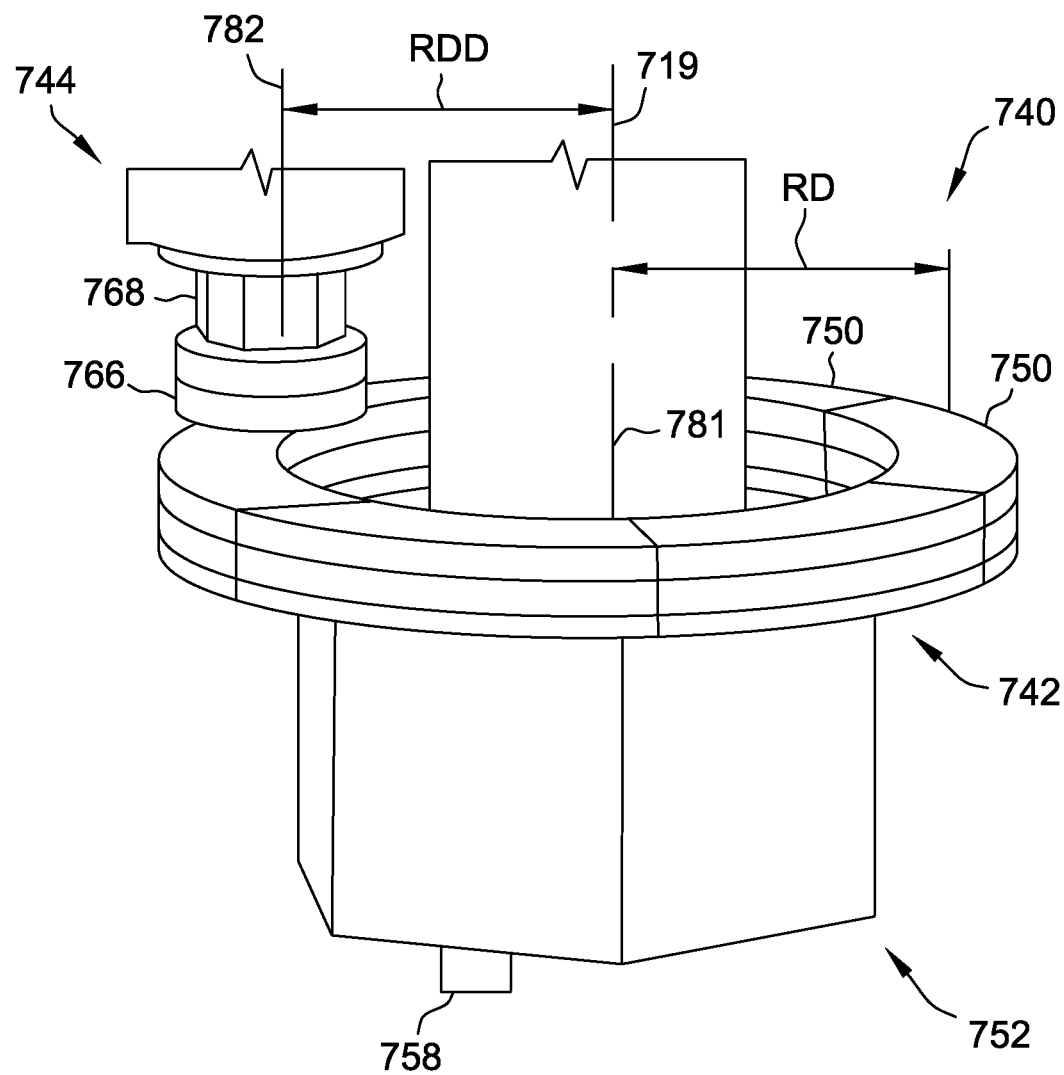
FIG. 12 is a partial perspective view of a magnet and bracket assembly according to another embodiment of the present invention utilizing a hollow cylindrical magnet, made from 6 magnet sectors on the bracket and an offset cylindrically shaped magnet to cooperate with the magnets on the bracket.

According to another aspect of the invention and referring now to FIG. 12, electrical switch 740 is shown. Switch 740 is similar to switch 40 of FIGS. 1-5, except first member 742 includes a plurality of spaced apart first member magnet segments 750 that are arch shaped. Each of the magnets magnet segments 750 are positioned at a radial distance RD from centerline 781 of base 752. Second member 744 with a second member magnet 766 is slidably fitted to housing 712 at stem 768 of second member 744. The stem 768 is positioned on stem centerline 782 parallel to axis of rotation 719 of rotor 718. The centerline is spaced radial distance RDD from axis of rotation 719 of rotor 718. Centerline 781 of base 752 may be coincident with axis of rotation 719 of rotor 718.

Figure 13:
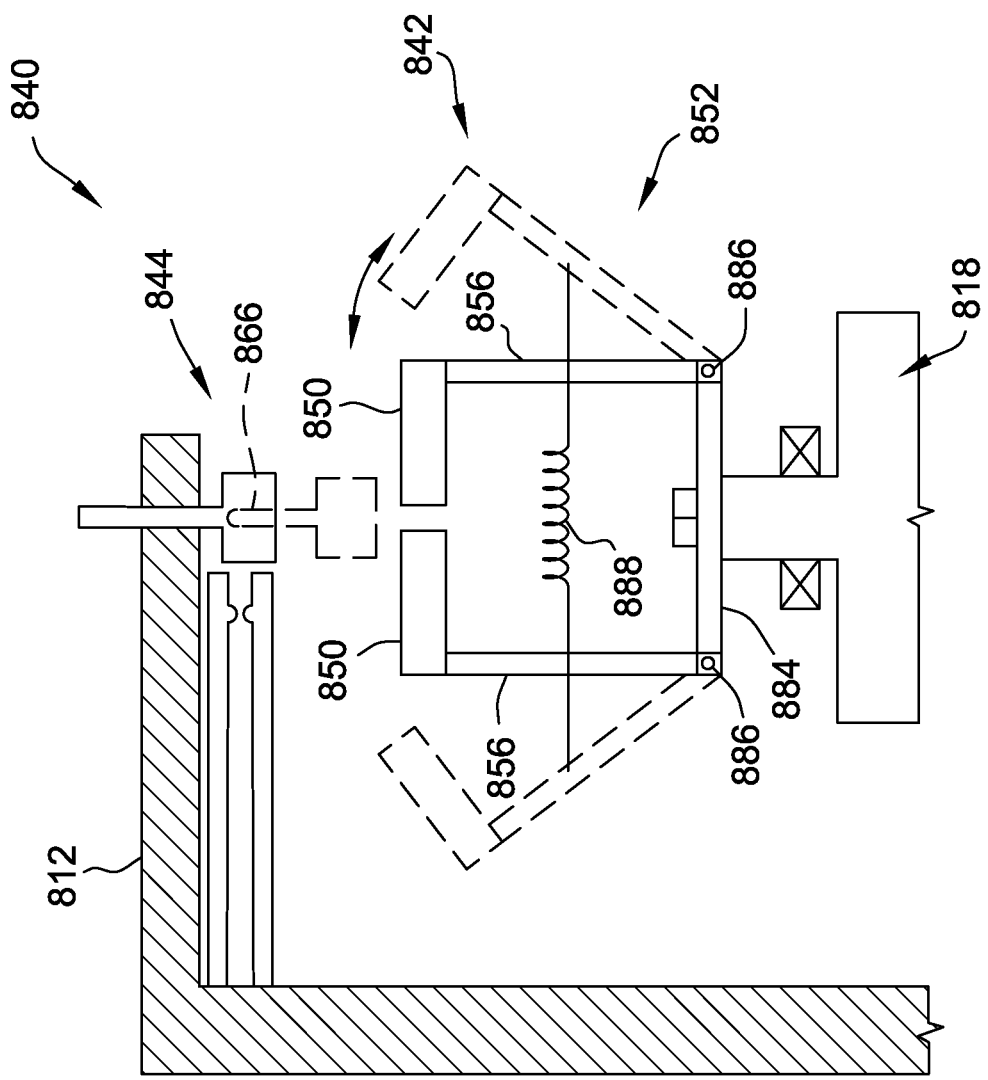
FIG. 13 is a partial plan view of a magnet and bracket assembly according to another embodiment of the present invention utilizing a mechanical hinge and spring to urge the magnets together when centrifugal forces are low.
Figure 14A:
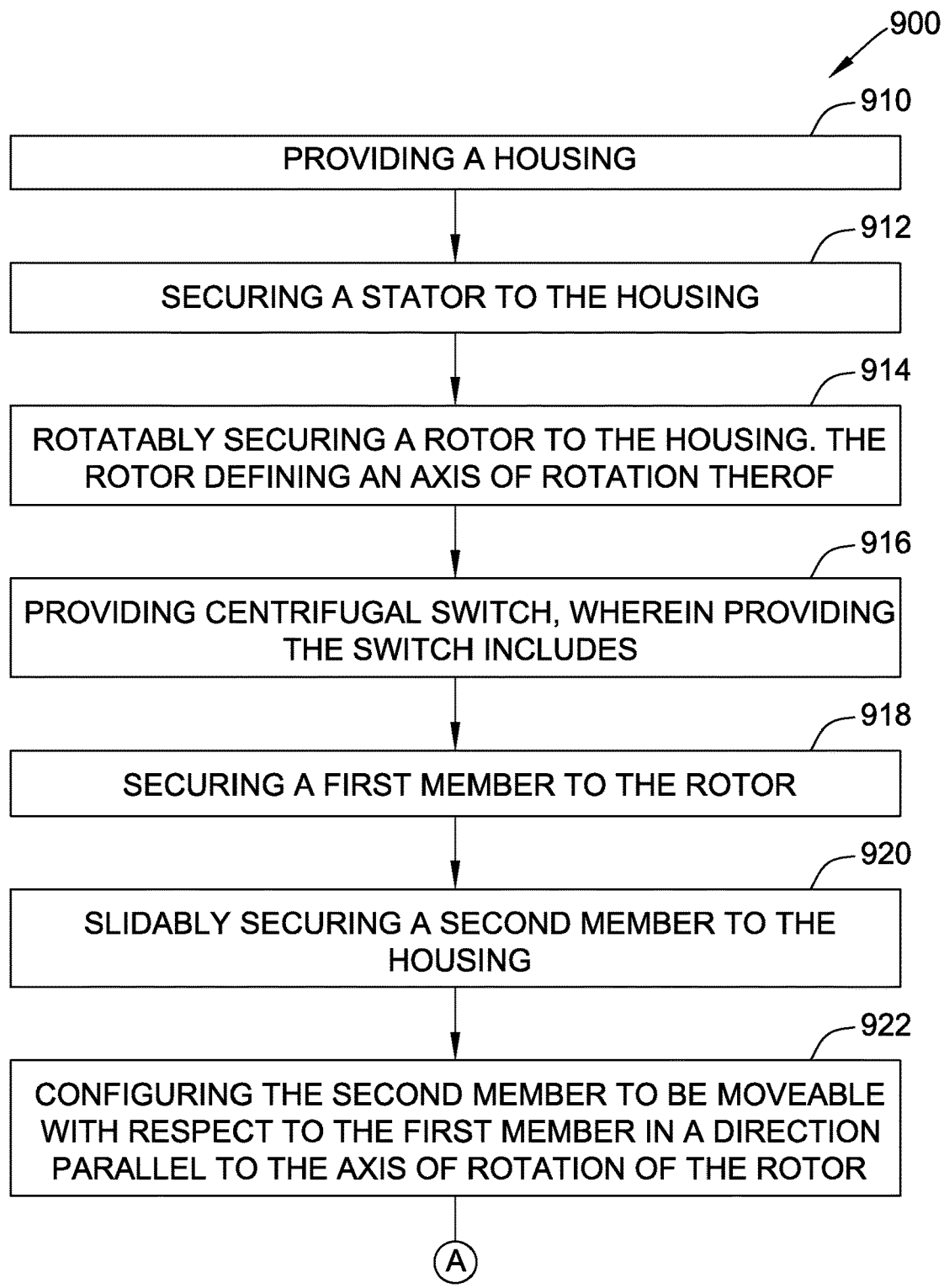
FIG. 14A is a first part of three parts of a flow chart of another embodiment of the present invention in the form of a method for providing an electric device.
Figure 14B:
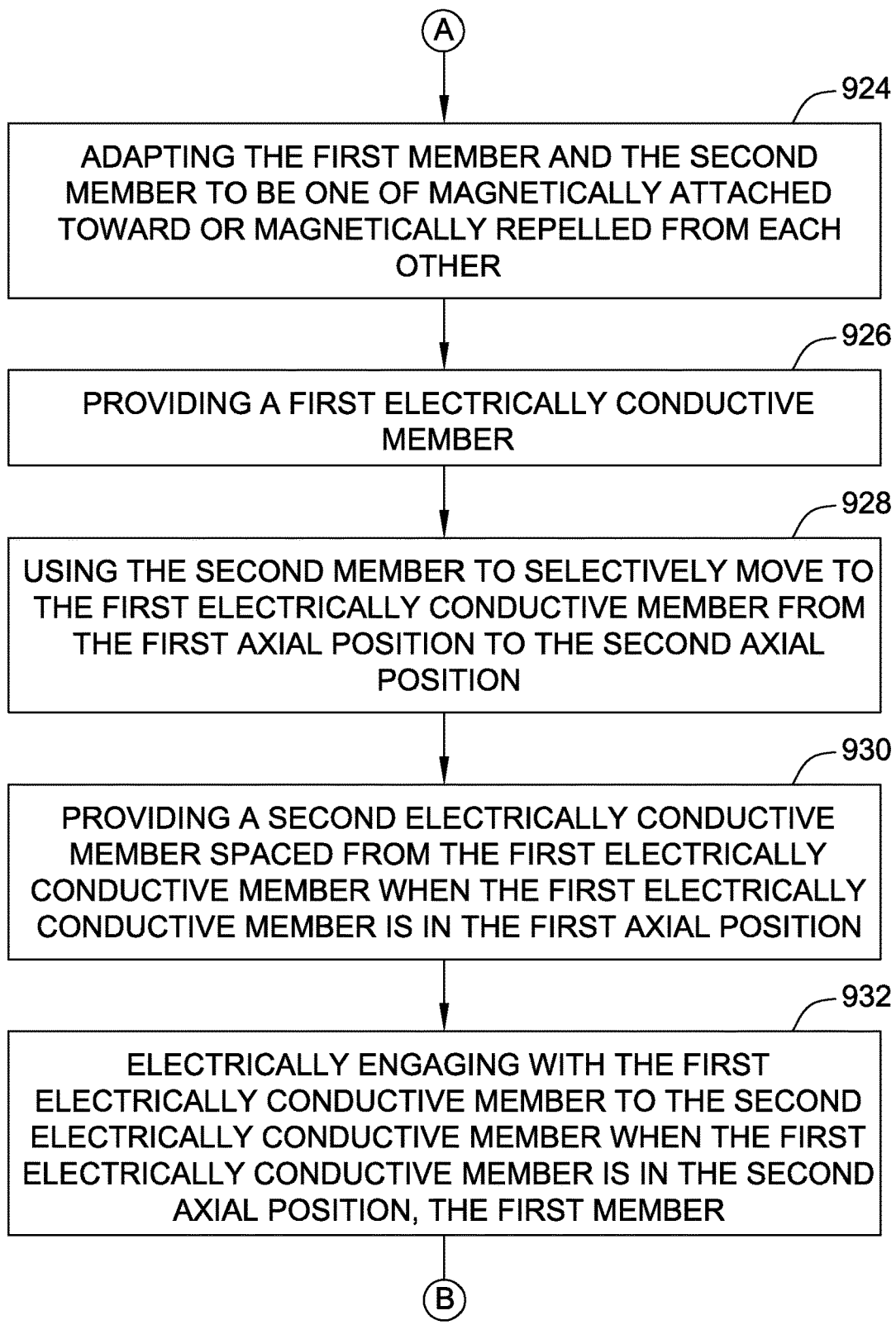
FIG. 14B is a second part of three parts of a flow chart of another embodiment of the present invention in the form of a method for providing an electric device.
Figure 14C:
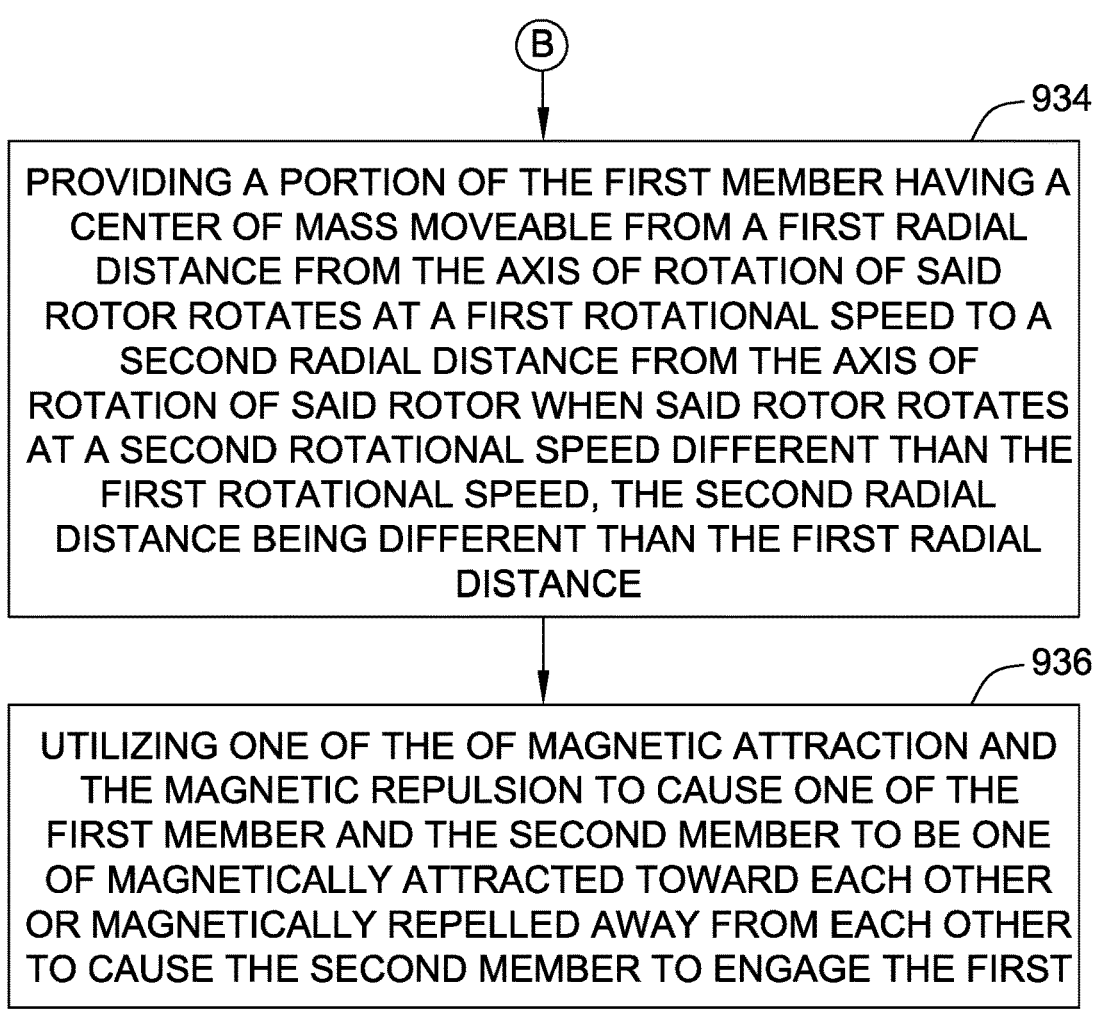
FIG. 14C is a third part of three parts of a flow chart of another embodiment of the present invention in the form of a method for providing an electric device.

According to another aspect of the invention and referring now to FIGS. 13-14, electrical switch 840 is shown. Switch 840 is similar to switch 40 of FIGS. 1-5, except first member 842 includes a pair of spaced apart first member magnets 850 that are mounted to first member base 852. The magnets 850 are each mounted to one of a plurality of arms 856.

The first member base 852 is made from a plurality of individual members. The first member base 852 includes first member mounting plate 884 which is secured to rotor 818. The first member base 852 also includes the spaced apart arms 856 that are connected to first member mounting plate 884 by mechanical hinges 886. The arms 856 are urged inwardly by a spring 888. The spring 888 is connected to the arms 856.

The spring 888 is adapted to permit the arms 856 to move outwardly about the hinge when the rotor 818 is rotated. As the arms 856 move outward as the rotor continues to rotationally accelerate, the first member magnets 850 move away from second member magnet 866 connected to second member 844 that is slidably fitted to housing 812 and moves downwardly permitting the first electrically conductive member to disconnect from the second electrically conductive member.

According to an aspect of the invention a method 900 for transmitting an electrical signal in an electric machine once a certain rotation speed has been obtained is provided. The method includes step 910 of providing a housing, step 912 of securing a stator to the housing, and step 914 of rotatably securing a rotor to the housing. The rotor defines an axis of rotation thereof.

The method also includes step 916 of providing a centrifugal switch, step 918 of securing a first member to the rotor, and step 920 of slidably securing a second member to the housing.

The method also includes the step 922 of configuring the second member to be moveable with respect to the first member in a direction parallel to the axis of rotation of the rotor, step 924 of adapting of the first member and the second member to be one of magnetically attracted toward or magnetically repelled from each other, and step 926 of providing a first electrically conductive member.

The method also includes the step 928 of using the second member to selectively move the first electrically conductive member from the first axial position to the second axial position, step 930 of providing a second electrically conductive member spaced from the first electrically conductive member when the first electrically conductive member is in the first axial position, and step 932 of electrically engaging with the first electrically conductive member to the second electrically conductive member when the first electrically conductive member is in the second axial position.

The method also includes step 934 of providing a portion of the first member having a center of mass moveable from a first radial distance from the axis of rotation of the rotor when the rotor rotates at a first rotational speed to a second radial distance from the axis of rotation of the rotor when the rotor rotates at a second rotational speed different than the first rotational speed, the second radial distance being different than the first radial distance.

The method also includes step 936 of utilizing one of the of magnetic attraction and the magnetic repulsion to cause one of the first member and the second member to be one of magnetically attracted toward each other or magnetically repelled away from each other to cause the second member to engage the first electrically conductive member with the second electrically conductive member when the rotor reaches one of the first rotational speed and the second rotational speed. The inner cavity is generally cylindrical and wherein the moisture guide is generally planar.

The methods, systems, and apparatus described herein facilitate efficient and economical assembly of an electric machine. Exemplary embodiments of methods, systems, and apparatus are described and/or illustrated herein in detail. The methods, systems, and apparatus are not limited to the specific embodiments described herein, but rather, components of each apparatus and system, as well as steps of each method, may be utilized independently and separately from other components and steps described herein. Each component, and each method step, can also be used in combination with other components and/or method steps.

When introducing elements/components/etc. of the methods and apparatus described and/or illustrated herein, the articles "a", "an", "the", and "the" are intended to mean that there are one or more of the element(s)/component(s)/etc. The terms "comprising", "including", and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Described herein are exemplary methods, systems and apparatus utilizing lower cost materials in a permanent magnet machine that reduces or eliminates the efficiency loss caused by the lower cost material. Furthermore, the exemplary methods system and apparatus achieve increased efficiency while reducing or eliminating an increase of the length of the machine. The methods, system and apparatus described herein may be used in any suitable application. However, they are particularly suited for HVAC and pump applications.

Exemplary embodiments of the fluid flow device and system are described above in detail. The electric machine and its components are not limited to the specific embodiments described herein, but rather, components of the systems may be utilized independently and separately from other components described herein. For example, the components may also be used in combination with other machine systems, methods, and apparatuses, and are not limited to practice with only the systems and apparatus as described herein. Rather, the exemplary embodiments can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electrical switch for an electric machine having body, a stator fixedly secured to the body and a rotor rotatably secured to said body and defining an axis of rotation thereof, said actuator comprising:
    a first member securable to said rotor and rotatable therewith, wherein the first member comprises first member magnets spaced apart from each other;
    a second member slidably securable to the body and configured to be moveable with respect to said first member in a direction parallel to the axis of rotation of the rotor, said first member and said second member being magnetically repelled from each other, wherein a portion of said second member comprises a magnet;
    a first electrically conductive member cooperable with said second member moveable in a direction parallel to the axis of rotation of the rotor from a first axial position to a second axial position, spaced from the first axial position, said second member adapted to urge said first electrically conductive member from the first axial position to the second axial position;
    a second electrically conductive member spaced from said first electrically conductive member when said first electrically conductive member is in the first axial position and electrically engaged with said first electrically conductive member when said first electrically conductive member is in the second axial position, said first member having a least a portion thereof having a center of mass moveable from a first radial distance from the axis of rotation of the rotor when the rotor rotates at a first rotational speed to a second radial distance from the axis of rotation of the rotor when the rotor rotates at a second rotational speed different than the first rotational speed, the second radial distance being different than the first radial distance, the magnetic repulsion causing the said first member and said second member to be magnetically repelled away from each other to cause to cause the second member to one of engage and disengage the first electrically conductive member with the second electrically conductive member when the rotor reaches the second rotational speed;
    wherein in the first axial position the first member and the second member are spaced apart and do not contact each other, and the first member magnets are spaced apart and do not contact each other;
    wherein in the second axial position, the first and the second member are spaced apart and do not contact each other, and the first member magnets are spaced apart and do not contact each other.

2. The electrical switch as in claim 1, where said first member and said second member are magnetically repelled by each other.

3. The electrical switch as in claim 1, wherein said first member comprises:
    a base fixedly secured to the end of the rotor;
    an arm having an end extending from the base at least partially in a direction parallel to the axis of rotation of the rotor; and
    a magnet connected to the end of the arm and spaced from the base.

4. The electrical switch as in claim 1, wherein said first member comprises:
    a plurality of spaced apart arms, each arm having a first end thereof; and
    a magnet connected to the first end of each of the plurality of arms.

5. The electrical switch as in claim 4, wherein each of the spaced apart arms are equally spaced apart with respect to the axis of rotation of the rotor.

6. The electrical switch as in claim 1, wherein said second member comprises:
    a first component fixedly secured to said body;
    a second component slidably secured to said first component; and
    one of a magnet and a ferrous material secured to said second component.

7. The electrical switch as in claim 6:
    wherein the first component comprises a cylindrical sleeve; and
    wherein the second component comprises a cylindrical rod.

8. The electrical switch as in claim 1, wherein said first electrically conductive member comprises a resilient metal having a first end connected to the body and a second cantilevered end engagable with said second member; and
    wherein said second electrically conductive member comprises a resilient metal having a first end connected to the body and a second cantilevered end engagable with said first electrically conductive member.

9. The electrical switch as in claim 1, wherein said first member comprises:
    a first component including a base fixedly secured to the end of the rotor, first and second legs, each leg extending at least partially axially outwardly from one of the distal ends of the planar base and first and second planar arms extending at least partially radially inwardly from the distal ends of the legs;
    one of a magnet and a ferrous material connected to the first arm; and
    the other of one of a magnet and a ferrous material connected to the second arm.

10. The electrical switch as in claim 9, wherein the ferrous material is permanently magnetized.

11. The electrical switch as in claim 9
wherein the first component is made from a plurality of individual members;
wherein the first arm is connected to the first leg by a mechanical hinge; and
further comprising a spring connected to the first leg and to the second arm, said spring adapted to permit the first arm to move outwardly about the hinge when the rotor is rotated.

12. The electrical switch as in claim 1:
further comprising a third member including a third member magnet, the third member connected to said first member, the third member magnet positioned farther than first member magnet from the second member.

13. The electrical switch as in claim 1, wherein said first member comprises:
an integral metal component having a planar base fixedly secured to the end of the rotor, first and second planar legs, each leg extending at least partially axially outwardly from one of the distal ends of the planar base and first and second planar arms extending at least partially radially inwardly from the distal ends of the planar legs;
a first magnet connected to the first arm; and
a second magnet connected to the second arm.

14. The electrical switch as in claim 13, further comprising a third magnet positioned on the planar base of said component.

15. The electrical switch as in claim 1:
wherein said first member includes a plurality of spaced apart arcuate magnet portions spaced from the axis of rotation of the rotor; and
wherein said second member has a centerline parallel to and spaced from the axis of rotation of the rotor.

16. An electric machine, comprising:
a housing, said housing having an inner surface defining a cavity therein;
a stator secured to said housing;
a rotor, rotatably secured to said housing and defining an axis of rotation thereof; and
a centrifugal switch including:
a first member securable to said rotor and rotatable therewith, wherein the first member comprises first member magnets spaced apart from each other;
a second member slidably securable to the body and configured to be moveable with respect to said first member in a direction parallel to the axis of rotation of the rotor, said first member and said second member being magnetically repelled from each other, wherein a portion of said second member comprises a magnet;
a first electrically conductive member cooperable with said second member moveable in a direction parallel to the axis of rotation of the rotor from a first axial position to a second axial position, spaced from the first axial position, said second member adapted to urge said first electrically conductive member from the first axial position to the second axial position; and
a second electrically conductive member spaced from said first electrically conductive member when said first electrically conductive member is in the first axial position and electrically engaged with said first electrically conductive member when said first electrically conductive member is in the second axial position, said first member having a least a portion thereof having a center of mass moveable from a first radial distance from the axis of rotation of the rotor when the rotor rotates at a first rotational speed to a second radial distance from the axis of rotation of the rotor when the rotor rotates at a second rotational speed different than the first rotational speed, the second radial distance being different than the first radial distance, the magnetic repulsion causing the said first member and said second member to be magnetically repelled away from each other to cause to cause the second member to one of engage and disengage the first electrically conductive member with the second electrically conductive member when the rotor reaches the second rotational speed;
wherein in the first axial position the first member and the second member are spaced apart and do not contact each other, and the first member magnets are spaced apart and do not contact each other;
wherein in the second axial position, the first and the second member are spaced apart and do not contact each other, and the first member magnets are spaced apart and do not contact each other.

17. The electric machine as in claim 16, wherein said first member and said second member are magnetically repelled by each other.

18. A method for transmitting an electrical signal in an electric machine once a certain rotation speed has been obtained, the method comprising the steps of:
providing a housing;
securing a stator to said housing;
rotatably securing a rotor to the housing, the rotor defining an axis of rotation thereof, and
providing centrifugal switch, wherein providing the switch includes;
securing a first member to the rotor, wherein the first member comprises first member magnets spaced apart from each other;
slidably securing a second member to the housing;
configuring the second member to be moveable with respect to the first member in a direction parallel to the axis of rotation of the rotor;
adapting the first member and the second member to be magnetically repelled from each other, wherein a portion of said second member comprises a magnet;
providing a first electrically conductive member;
using the second member to selectively move the first electrically conductive member from the first axial position to the second axial position;
providing a second electrically conductive member spaced from the first electrically conductive member when the first electrically conductive member is in the first axial position;
electrically engaging with the first electrically conductive member to the second electrically conductive member when the first electrically conductive member is in the second axial position, the first member;
providing a portion of the first member having a center of mass moveable from a first radial distance from the axis of rotation of said rotor when said rotor rotates at a first rotational speed to a second radial distance from the axis of rotation of said rotor when said rotor rotates at a second rotational speed different than the first rotational speed, the second radial distance being different than the first radial distance; and
utilizing the magnetic repulsion to cause one of the first member and the second member to be magnetically repelled away from each other to cause the second member to engage the first electrically conductive member with the second electrically conductive member when said rotor reaches one of the first rotational speed and the second rotational speed;

wherein in the first axial position the first member and the second member are spaced apart and do not contact each other, and the first member magnets are spaced apart and do not contact each other, wherein in the second axial position, the first and the second member are spaced apart and do not contact each other, and the first member magnets are spaced apart and do not contact each other.

* * * * *